(12) United States Patent
Hiro

(10) Patent No.: US 11,128,827 B2
(45) Date of Patent: Sep. 21, 2021

(54) IMAGING DEVICE DRIVE CIRCUIT AND IMAGING DEVICE

(71) Applicant: SONY SEMICONDUCTOR SOLUTIONS CORPORATION, Kanagawa (JP)

(72) Inventor: Tomoyuki Hiro, Kumamoto (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/975,052

(22) PCT Filed: Jan. 23, 2019

(86) PCT No.: PCT/JP2019/002026
§ 371 (c)(1),
(2) Date: Aug. 21, 2020

(87) PCT Pub. No.: WO2019/176303
PCT Pub. Date: Sep. 19, 2019

(65) Prior Publication Data
US 2020/0412988 A1    Dec. 31, 2020

(30) Foreign Application Priority Data
Mar. 15, 2018   (JP) .............................. JP2018-047406

(51) Int. Cl.
*H04N 5/369*   (2011.01)
*H04N 5/378*   (2011.01)

(52) U.S. Cl.
CPC ......... *H04N 5/3696* (2013.01); *H04N 5/3698* (2013.01); *H04N 5/378* (2013.01)

(58) Field of Classification Search
CPC .... H04N 5/3696; H04N 5/378; H04N 5/3698; H04N 5/217; H04N 5/335; H04N 5/374;
(Continued)

(56) References Cited

U.S. PATENT DOCUMENTS

| | | | | |
|---|---|---|---|---|
| 5,877,808 | A * | 3/1999 | Iizuka | H04N 5/2353 348/311 |
| 7,652,703 | B2 * | 1/2010 | Panicacci | H04N 5/378 348/308 |

(Continued)

FOREIGN PATENT DOCUMENTS

| | | |
|---|---|---|
| JP | 2001-045377 A | 2/2001 |
| JP | 2005-210626 A | 8/2005 |

(Continued)

OTHER PUBLICATIONS

International Search Report and Written Opinion of PCT Application No. PCT/JP2019/002026, dated Apr. 16, 2019, 07 pages of ISRWO.

*Primary Examiner* — Pritham D Prabhakher
(74) *Attorney, Agent, or Firm* — Chip Law Group

(57) ABSTRACT

In an imaging device that transmits control signals to a large number of pixels, an influence is reduced of delay at the time of signal transmission. An imaging device drive circuit includes a plurality of control signal lines, a control signal distribution line, two control signal transmission units, and two operation units. The plurality of control signal lines each transmits a control signal for each of a plurality of pixels that generates image signals depending on incident light on the basis of the control signal. The control signal distribution line has a shape of a line, and the plurality of control signal lines is connected thereto in a distributed manner, and the control signal distribution line distributes the control signals supplied from both ends of the line to the plurality of control signal lines.

7 Claims, 17 Drawing Sheets

(58) Field of Classification Search
CPC .... H04N 5/341; H04N 5/3532; H04N 5/2353; H04N 5/3745; H01L 27/14603; H01L 27/148
USPC .......................................................... 348/294
See application file for complete search history.

(56) References Cited

U.S. PATENT DOCUMENTS

| | | | |
|---|---|---|---|
| 7,750,964 B2 * | 7/2010 | Hirota | H04N 5/217 348/312 |
| 9,001,242 B2 * | 4/2015 | Miyake | H04N 5/2353 348/294 |
| 9,609,254 B2 * | 3/2017 | Guo | H04N 3/1512 |
| 10,998,373 B2 * | 5/2021 | Odahara | H01L 27/14634 |
| 2007/0013799 A1 | 1/2007 | Hirota et al. | |
| 2007/0242151 A1 | 10/2007 | Suzuki et al. | |
| 2012/0112039 A1 * | 5/2012 | Sugano | H04N 5/3745 250/208.1 |
| 2013/0001399 A1 * | 1/2013 | Egawa | H04N 5/378 250/208.1 |
| 2013/0100328 A1 | 4/2013 | Miyake | |
| 2014/0092285 A1 * | 4/2014 | Moriyama | H04N 5/37452 348/297 |
| 2015/0189197 A1 * | 7/2015 | Guo | H04N 5/376 348/308 |
| 2015/0264288 A1 * | 9/2015 | Okamoto | H04N 5/376 250/208.1 |
| 2019/0312079 A1 * | 10/2019 | Odahara | H04N 5/372 |

FOREIGN PATENT DOCUMENTS

| | | |
|---|---|---|
| JP | 2007-221368 A | 8/2007 |
| JP | 2008-141705 A | 6/2008 |
| JP | 2012-029005 A | 2/2012 |
| JP | 2017-022259 A | 1/2017 |

\* cited by examiner

IMAGING DEVICE DRIVE CIRCUIT AND IMAGING DEVICE

CROSS REFERENCE TO RELATED APPLICATIONS

This application is a U.S. National Phase of International Patent Application No. PCT/JP2019/002026 filed on Jan. 23, 2019, which claims priority benefit of Japanese Patent Application No. JP 2018-047406 filed in the Japan Patent Office on Mar. 15, 2018. Each of the above-referenced applications is hereby incorporated herein by reference in its entirety.

TECHNICAL FIELD

The present disclosure relates to an imaging device drive circuit and an imaging device. More specifically, the present disclosure relates to an imaging device drive circuit that drives an imaging element in which a plurality of pixels is arranged, and an imaging device that includes the imaging device drive circuit.

BACKGROUND ART

An imaging device includes a plurality of pixels arranged in a two-dimensional lattice and a peripheral circuit that drives the pixels. In the peripheral circuit, a pixel drive circuit that generates a control signal for controlling imaging in the pixels is arranged, and the generated control signal is transmitted to the plurality of pixels. The control signal is transmitted, for example, via a signal line wired to a plurality of pixels in a daisy chain. With the increase in screen size and resolution of imaging devices in recent years, many pixels are arranged on a semiconductor chip. As a result of the increase in the number of pixels connected to the signal line, the wiring distance of the signal line increases. For this reason, the control signal may be attenuated at the time of transmission of the control signal.

Thus, an imaging device has been devised that shortens transmission distances of the control signal to the pixels and reduces attenuation of the control signal, by forming the plurality of pixels and the peripheral circuit on a first substrate and a second substrate, respectively, and by stacking these substrates. Specifically, control signal lines are arranged on the second substrate in the vicinity of the plurality of pixels on the first substrate, and the control signal is supplied for each of the pixels on the first substrate via a pad arranged on a bonding surface with the first substrate. Then, an amplifier circuit is arranged for each of the pixels on the control signal line of the second substrate, and the attenuated control signal is amplified and transmitted, in the devised imaging device (for example, see Patent Document 1).

CITATION LIST

Patent Document

Patent Document 1: Japanese Patent Application Laid-Open No. 2017-022259

SUMMARY OF THE INVENTION

Problems to be Solved by the Invention

In the conventional technology described above, since the signal line arranged on the second substrate is connected in series with the amplifier circuit arranged for each of the pixels, there is a problem that the control signal is delayed. For this reason, there is a problem that imaging timings for the respective pixels deviate from each other and the image quality is degraded.

The present disclosure has been made in view of the above-described problems, and an object thereof is to reduce an influence of delay at the time of transmission of a control signal in an imaging device that transmits the control signal to a large number of pixels.

Solutions to Problems

The present disclosure has been made to eliminate the problems described above, and a first aspect thereof is an imaging device drive circuit including: a plurality of control signal lines, each of which transmits a control signal for each of a plurality of pixels that generates image signals depending on incident light on the basis of the control signal; a control signal distribution line that has a shape of a line and to which the plurality of control signal lines is connected in a distributed manner and that distributes the control signal supplied from each of both ends of the line to the plurality of control signal lines; two control signal transmission units, each of which includes a plurality of transmission paths each including a signal shaping unit that shapes the control signal, and transmits the control signal to each of ends of the control signal distribution line; and two operation units arranged at the respective ends of the control signal distribution line, the operation units each performing an operation on a plurality of the control signals respectively transmitted by the plurality of transmission paths and supplying an operation result to a corresponding one of the ends.

Furthermore, in the first aspect, the operation units each may perform a logical product operation on the plurality of control signals transmitted.

Furthermore, in the first aspect, the operation units each may perform a logical sum operation on the plurality of control signals transmitted.

Furthermore, in the first aspect, the operation units each may perform a majority operation on the plurality of control signals transmitted.

Furthermore, in the first aspect, the control signal transmission units each may include a plurality of the signal shaping units arranged in a distributed manner in a corresponding one of the transmission paths.

Furthermore, in the first aspect, a control signal output unit may be further included that is arranged on the plurality of control signal lines and converts the control signal transmitted into the control signal for each of the pixels.

Furthermore, a second aspect of the present disclosure is an imaging device including: a plurality of pixels that generates image signals depending on incident light on the basis of a control signal; a plurality of control signal lines, each of which transmits the control signal for each of the plurality of pixels; a control signal distribution line that has a shape of a line and to which the plurality of control signal lines is connected in a distributed manner and that distributes the control signal supplied from each of both ends of the line to the plurality of control signal lines; two control signal transmission units, each of which includes a plurality of transmission paths each including a signal shaping unit that shapes the control signal, and transmits the control signal to each of ends of the control signal distribution line; and two operation units arranged at the respective ends of the control signal distribution line, the operation units each performing an operation on a plurality of the control signals respectively transmitted by the plurality of transmission paths and supplying an operation result to a corresponding one of the ends.

According to such aspects, the imaging device drive circuit has a configuration in which the plurality of control signal lines is connected to the control signal distribution line, and the control signal supplied from each of both ends of the control signal distribution line is distributed to the plurality of control signal lines. At that time, an effect is brought that control signals are transmitted to each of the ends of the control signal line distribution line in parallel by the plurality of transmission paths and then the operation is performed, and the operation result is supplied to each of the ends of the control signal distribution line as the control signal for each of the pixels. It is expected that differences in delay time in the transmission paths are absorbed by the operation on the control signals transmitted by the plurality of transmission paths.

Effects of the Invention

According to the present disclosure, an excellent effect is achieved of reducing the influence of delay at the time of transmission of the control signal in the imaging device that transmits the control signal to the large number of pixels.

MODE FOR CARRYING OUT THE INVENTION

Figure 1:
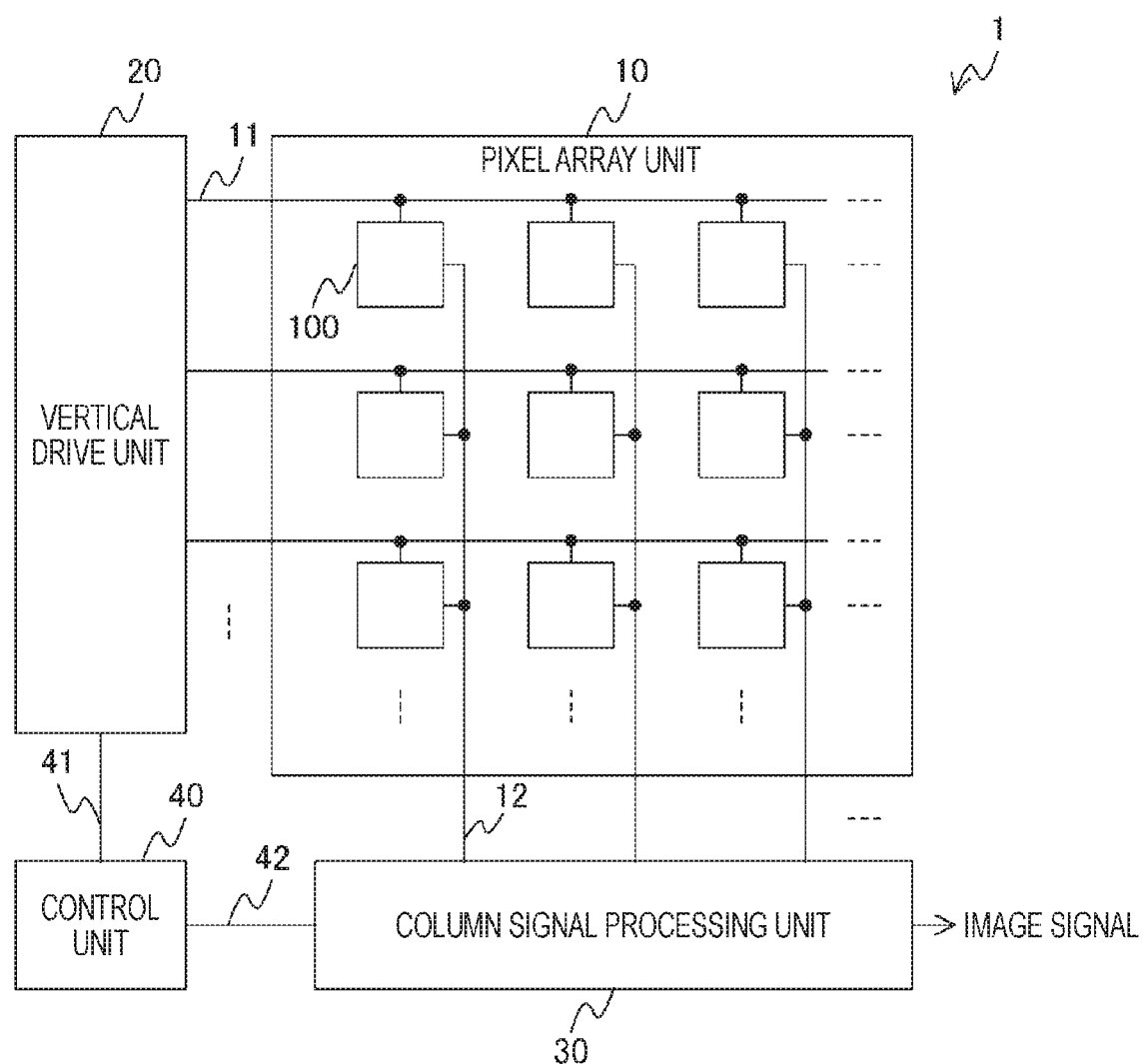
FIG. 1 is a diagram illustrating a configuration example of an imaging device according to an embodiment of the present disclosure.

Next, a mode for carrying out the present disclosure (hereinafter, referred to as an embodiment) will be described with reference to the drawings. In the drawings below, the same or similar portions are denoted by the same or similar reference numerals. However, the drawings are schematic, and the dimensional ratios and the like of the respective portions do not always match actual ones. Furthermore, it goes without saying that portions are included where dimensional relationships and ratios are different between the drawings. Furthermore, embodiments will be described in the following order.

1. First Embodiment
2. Second Embodiment
3. Third Embodiment
4. Configuration of solid-state imaging device
5. Application example to stacked imaging device
6. Application example to camera
7. Application example to endoscopic surgical system
8. Application example to mobile body 1. First Embodiment

[Configuration of Imaging Device]

FIG. 1 is a diagram illustrating a configuration example of an imaging device according to an embodiment of the present disclosure. An imaging device 1 in the figure includes a pixel array unit 10, a vertical drive unit 20, a column signal processing unit 30, and a control unit 40.

The pixel array unit 10 includes pixels 100 that are arranged in a two-dimensional lattice. Here, each pixel 100 generates an image signal depending on light with which the pixel 100 is irradiated. The pixel 100 includes a photoelectric conversion unit that generates charges depending on the light with which the pixel 100 is irradiated. Furthermore, the pixel 100 further includes a pixel circuit. The pixel circuit generates the image signal based on the charges generated by the photoelectric conversion unit. The generation of the image signal is controlled by a control signal generated by the vertical drive unit 20 described later. In the pixel array unit 10, signal lines 11 and 12 are arranged in an XY matrix. Each signal line 11 is a signal line that transmits the control signal for the pixel circuit in the pixel 100, is arranged for each row of the pixel array unit 10, and is commonly wired to the pixels 100 arranged in each row. Each signal line 12 is a signal line that transmits the image signal generated by the pixel circuit of the pixel 100, is arranged for each column of the pixel array unit 10, and is commonly wired to the pixels 100 arranged in each column. These photoelectric conversion units and pixel circuits are formed on a semiconductor substrate.

The vertical drive unit 20 generates the control signal for the pixel circuit of the pixel 100. The vertical drive unit 20 transmits the generated control signal to the pixel 100 via the signal line 11 in the figure. The column signal processing unit 30 processes the image signal generated by the pixel 100. The column signal processing unit 30 processes the image signal transmitted from the pixel 100 via the signal line 12 in the figure. The processing in the column signal processing unit 30 corresponds to, for example, analog-to-digital conversion for converting an analog image signal generated in the pixel 100 into a digital image signal. The image signal processed by the column signal processing unit 30 is output as the image signal of the imaging device 1. The control unit 40 controls the entire imaging device 1. The control unit 40 controls the imaging device 1 by generating and outputting control signals for controlling the vertical drive unit 20 and the column signal processing unit 30. The control signals generated by the control unit 40 are transmitted to the vertical drive unit 20 and the column signal processing unit 30 via signal lines 41 and 42, respectively.

It is assumed that m rows of pixels 100 are arranged in the pixel array unit 10. As will be described later, the vertical drive unit 20 generates and outputs control signals for the pixels 100 arranged in m rows. Note that, the vertical drive unit 20 is an example of an imaging device drive circuit described in the claims.

[Circuit Configuration of Pixel]

Figure 2:
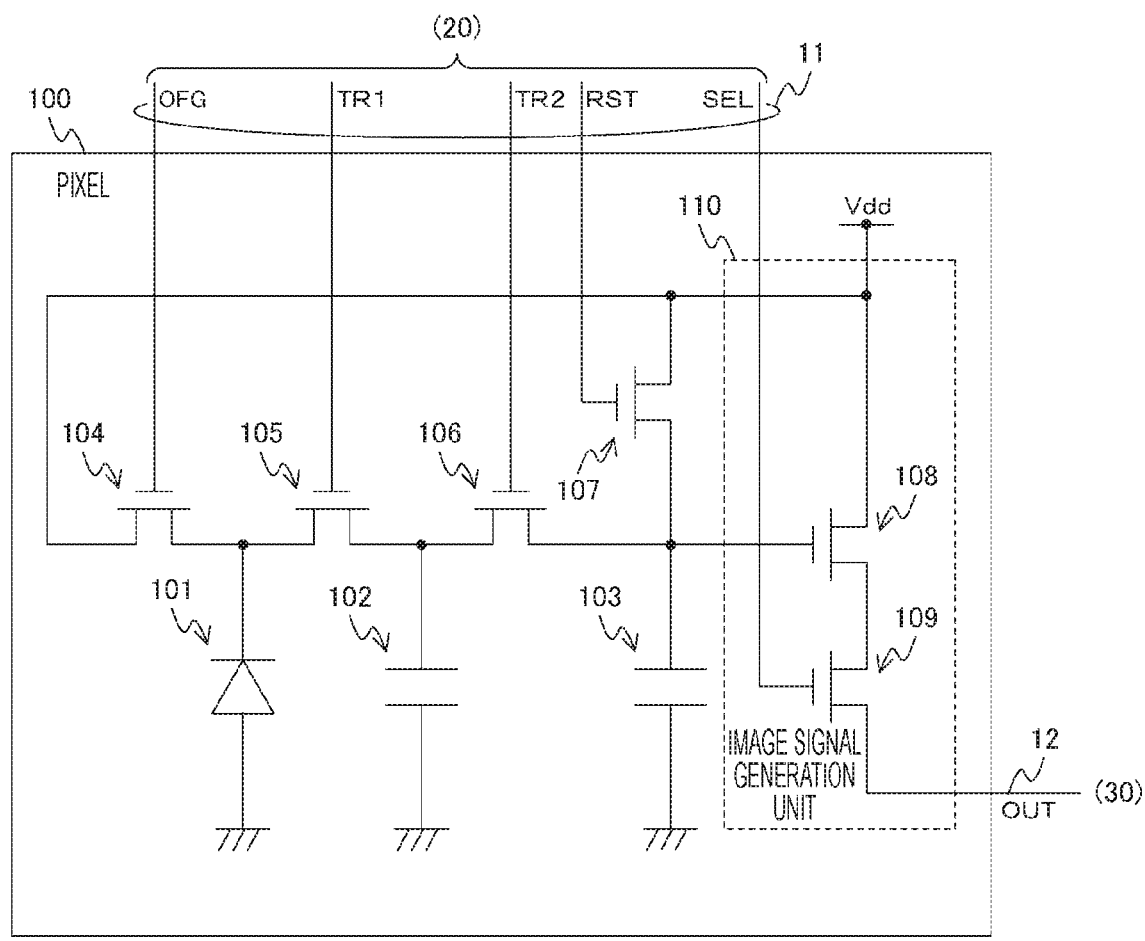
FIG. 2 is a diagram illustrating an example of a circuit configuration of a pixel according to the embodiment of the present disclosure.

FIG. 2 is a diagram illustrating an example of a circuit configuration of a pixel according to the embodiment of the present disclosure. The figure is a circuit diagram illustrating a configuration of the pixel 100. The pixel 100 in the figure includes a photoelectric conversion unit 101, a first charge holding unit 103, a second charge holding unit 102, and MOS transistors 104 to 109. Furthermore, signal lines OFG, TR1, TR2, RST, SEL, and OUT are wired to the pixel 100. The signal lines OFG, TR1, TR2, RST, and SEL are signal lines that transmit control signals for the pixel 100. These signal lines are connected to the gates of the MOS transistors. By applying voltages higher than a threshold value between the gate and the source to the MOS transistors via these signal lines, the MOS transistors can be turned on. The signal lines OFG, TR1, TR2, RST, and SEL constitute the signal lines 11. On the other hand, the signal line OUT constitutes the signal line 12, and transmits the image signal generated by the pixel 100. Furthermore, a power supply line Vdd is wired to the pixel 100, and power is supplied.

The anode of the photoelectric conversion unit 101 is grounded, and the cathode is connected to the sources of the MOS transistors 104 and 105. The drain of the MOS transistor 104 is connected to the power supply line Vdd, and the gate is connected to the signal line OFG. The drain of the MOS transistor 105 is connected to the source of the MOS transistor 106 and one end of the second charge holding unit 102. The other end of the second charge holding unit 102 is grounded. The gate of the MOS transistor 105 is connected to the signal line TR1, and the gate of the MOS transistor 106 is connected to the signal line TR2. The drain of the MOS transistor 106 is connected to the source of the MOS transistor 107, the gate of the MOS transistor 108, and one end of the first charge holding unit 103. The other end of the first charge holding unit 103 is grounded. The gate of the MOS transistor 107 is connected to the signal line RST. The drains of the MOS transistors 107 and 108 are commonly connected to the power supply line Vdd, and the source of the MOS transistor 108 is connected to the drain of MOS transistor 109. The source of the MOS transistor 109 is connected to the signal line OUT, and the gate is connected to the signal line SEL.

The photoelectric conversion unit 101 generates and holds the charges depending on the light with which the pixel 100 is irradiated, as described above. For the photoelectric conversion unit 101, a photodiode can be used.

The MOS transistor 104 is a transistor that resets the photoelectric conversion unit 101. The MOS transistor 104 discharges the charges held in the photoelectric conversion unit 101 to the power supply line Vdd by applying a power supply voltage to the photoelectric conversion unit 101, to perform resetting. The resetting of the photoelectric conversion unit 101 by the MOS transistor 104 is controlled by a signal transmitted by the signal line OFG.

The MOS transistor 105 is a transistor that transfers the charges generated by the photoelectric conversion of the photoelectric conversion unit 101 to the second charge holding unit 102. The transfer of the charges in the MOS transistor 105 is controlled by a signal transmitted by the signal line TR1.

The second charge holding unit 102 is a capacitor that holds the charges transferred by the MOS transistor 105.

The MOS transistor 106 is a transistor that transfers the charges held in the second charge holding unit 102 to the first charge holding unit 103. The transfer of the charges in the MOS transistor 106 is controlled by a signal transmitted by the signal line TR2.

The MOS transistor 108 is a transistor that generates a signal based on the charges held in the first charge holding unit 103. The MOS transistor 109 is a transistor that outputs the signal generated by the MOS transistor 108 to the signal line OUT as an image signal. The MOS transistor 109 is controlled by a signal transmitted by the signal line SEL. Furthermore, the MOS transistors 108 and 109 constitute an image signal generation unit 110.

The MOS transistor 107 is a transistor that resets the first charge holding unit 103 by discharging the charges held in the first charge holding unit 103 to the power supply line Vdd. The reset by the MOS transistor 107 is controlled by a signal transmitted by the signal line RST.

The generation of the image signal in the pixel 100 in the figure can be performed as follows. First, the MOS transistor 104 is turned on to reset the photoelectric conversion unit 101. Next, after a lapse of a predetermined time, the MOS transistors 106 and 107 are turned on to reset the second charge holding unit 102. Next, the MOS transistor 105 is turned on. As a result, the charges generated in the photoelectric conversion unit 101 are transferred and held in the second charge holding unit 102. The operation from the reset of the photoelectric conversion unit 101 to the transfer of the charges by the MOS transistor 105 is performed simultaneously in all the pixels 100 arranged in the pixel array unit 10. That is, global reset that is simultaneous reset in all the pixels 100, and simultaneous charge transfer in all the pixels 100 are executed. As a result, a global shutter is implemented. Note that, a period from the reset of the photoelectric conversion unit 101 to the transfer of the charges by the MOS transistor 105 corresponds to an exposure period.

Next, the MOS transistor 107 is turned on again to reset the first charge holding unit 103. Next, the MOS transistor 106 is turned on to transfer the charges held in the second charge holding unit 102 to the first charge holding unit 103 and cause the charges to be held. As a result, the MOS transistor 108 generates an image signal depending on the charges held in the first charge holding unit 103. Next, by turning on the MOS transistor 109, the image signal generated by the MOS transistor 108 is output to the signal line OUT. The operation from the reset of the first charge holding unit 103 to the output of the image signal is sequentially performed for each pixel 100 arranged in the row of the pixel array unit 10. By outputting the image signals in the pixels 100 in all rows of the pixel array unit 10, a frame is generated that is an image signal for one screen, and output from the imaging device 1.

By performing the generation and output of the image signal in the pixel 100 in parallel with each other in the exposure period described above, the time required for imaging and transferring the image signal can be reduced. Furthermore, by simultaneously performing exposure in all the pixels 100 of the pixel array unit 10, the occurrence of frame distortion can be prevented, and the image quality can be improved. As described above, the second charge holding unit 102 is used to temporarily hold the charges generated by the photoelectric conversion unit 101 when the global shutter is performed.

[Configuration of Vertical Drive Unit]

Figure 3:
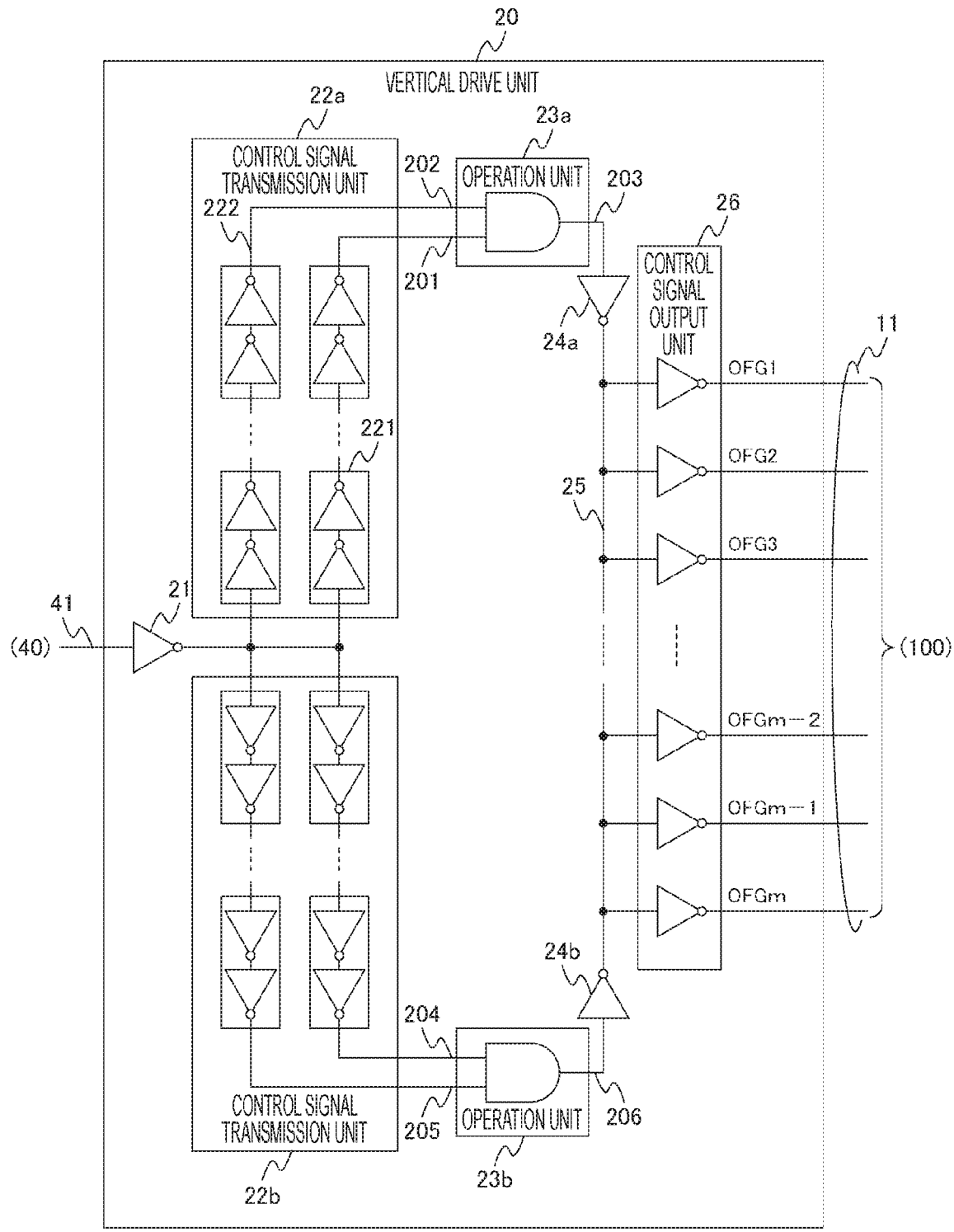
FIG. 3 is a diagram illustrating a configuration example of a vertical drive unit according to a first embodiment of the present disclosure.

FIG. 3 is a diagram illustrating a configuration example of a vertical drive unit according to a first embodiment of the present disclosure. The figure is a diagram illustrating a configuration example of the vertical drive unit 20, and is a diagram illustrating a configuration example of a portion that generates a control signal simultaneously input to all the pixels 100 arranged in the pixel array unit 10 of the control signals described in FIG. 2. The control signal transmitted by the signal line OFG or the signal line TR1 corresponds to such a control signal. The configuration of the vertical drive unit 20 will be described by taking the control signal transmitted by the signal line OFG as an example. As described above, the control signal transmitted by the signal line OFG is the control signal transmitted at the time of the global reset. A control signal depending on the timing of the global reset is generated by the control unit 40, and is input to the vertical drive unit 20 via the signal line 41. The vertical drive unit 20 distributes the input control signal to the plurality of signal lines 11 and outputs the distributed signals to the pixels 100.

The vertical drive unit 20 illustrated in the figure includes inverting gates 21, 24a, and 24b, control signal transmission units 22a and 22b, operation units 23a and 23b, a control signal distribution line 25, and a control signal output unit 26. Furthermore, in the figure, a plurality of the signal lines OFG (OFG1 to OFGm) is illustrated among the signal lines 11. OFG1 to OFGm in the figure represent the signal lines OFG wired to the pixels 100 in the first row to the m-th row of the pixel array unit 10. That is, the signal lines OFG1 to OFGm are control signal lines that transmit control signals for the pixels 100 arranged in the respective rows of the pixel array unit 10.

The control signal distribution line 25 is a signal line to which the plurality of signal lines (signal lines OFG1 to OFGm) is connected, and is a wiring line that distributes the control signal to these signal lines OFG1 to OFGm. The operation units 23a and 23b described later are respectively connected to both ends of the control signal distribution line 25, and the control signals are supplied to the control signal distribution line 25 by the operation units 23a and 23b. The signal lines OFG1 to OFGm are connected to the control signal distribution line 25 in a distributed manner. Specifically, the control signal distribution line 25 has, for example, substantially the same length as that in the row direction of the pixel array unit 10, and the signal lines OFG1 to OFGm are connected in a distributed manner in the order of the rows of the pixel array unit 10. As a result, it is possible to reduce the skew when the control signals supplied from the both ends of the control signal distribution line 25 are distributed to the signal lines OFG1 to OFGm, and to make the timing uniform of the global reset for each row of the pixel array unit 10. Note that, the control signal output unit 26 described later is inserted in the signal lines OFG1 to OFGm in the figure.

Control signal transmission units 22 transmit the control signal generated by the control unit 40 to the respective ends of the control signal distribution line 25. In the figure, the two control signal transmission units 22a and 22b are arranged, and the control signal input via the inverting gate 21 is transmitted to each of the both ends of the control signal distribution line 25. The control signal is transmitted to each of the both ends of the control signal distribution line 25 by the control signal transmission units 22a and 22b having the same configuration, whereby the paths from the signal line 41 to the both ends of the control signal distribution line 25 are symmetrical with each other. This is to reduce a difference between delay times of the control signals at the both ends of the control signal distribution line 25. Each control signal transmission unit 22 includes a plurality of transmission paths 222, and a signal shaping unit 221 arranged on each of the plurality of transmission paths 222. The control signal transmission unit 22 in the figure illustrates an example in which two transmission paths 222 are arranged.

Each transmission path 222 transmits the input control signal to an end of the control signal distribution line 25. The signal shaping unit 221 is inserted in the transmission path 222 and shapes the waveform of the control signal. When transmitted by the transmission path 222, the control signal is affected by the wiring resistance and the parasitic capacitance of the transmission path 222, and degradation of the signal level and distortion of the waveform such as blunting of the pulse waveform occur. The signal shaping unit 221 shapes the waveform of the control signal having the distortion. As the signal shaping unit 221, a repeater or an amplifier circuit can be used. Furthermore, by arranging a plurality of the signal shaping units 221 in the transmission path 222 in a distributed manner, it is possible to perform transmission of the control signal while preventing an increase in distortion of the waveform of the control signal on the transmission path 222.

Furthermore, the control signal transmission unit 22 includes two transmission paths 222 on which the signal shaping unit 221 is similarly arranged. These two transmission paths 222 are commonly connected to the signal line 41 via the inverting gate 21, and transmit control signals in parallel. The two transmission paths 222 are connected to an operation unit 23 described later.

The operation unit 23 performs operation on the control signals transmitted by the plurality of transmission paths 222 of the control signal transmission unit 22. The operation unit 23 in the figure performs a logical product operation. An output of the operation unit 23 is connected to one end of the control signal distribution line 25, and the result of the operation by the operation unit 23 is supplied to the one end of the control signal distribution line 25. In the figure, the output of the operation unit 23 is connected to one end of the control signal distribution line 25 via an inverting gate 24. Specifically, signal lines 201 and 202 respectively connected to the two transmission paths 222 of the control signal transmission unit 22a are connected to inputs of the operation unit 23a, and a signal line 203 connected to an output of the operation unit 23a is connected to one end of the control signal distribution line 25 via the inverting gate 24a. Similarly, signal lines 204 and 205 respectively connected to the two transmission paths 222 of the control signal transmission unit 22b are connected to inputs of the operation unit 23b, and a signal line 206 connected to an output of the operation unit 23b is connected to the other end of the control signal distribution line 25 via the inverting gate 24b.

As described above, control signals having the same configuration are respectively transmitted to the both ends of the control signal distribution line 25 by the control signal transmission units 22a and 22b. However, since the transfer characteristics of the control signal transmission units 22a and 22b are different from each other, propagation delay times of the control signals are also different from each other. When a case is assumed where the control unit 40 generates control signals of digital signals, and the control signal transmission units 22 transmit the digital signals, in a case where the control signals make transitions, for example, from the value "0" to "1", a temporal deviation occurs when the control signals are respectively transmitted by the control signal transmission units 22a and 22b, and control signals having different values may be input to the both ends of the control signal distribution line 25.

For example, in a case where a delay time of the control signal transmission unit 22b is longer than that of the control signal transmission unit 22a, the output of the inverting gate 24a transitions to the value "1" and then the output of the inverting gate 24b transitions to the value "1". During this period, the inverting gate 24a that outputs the value "1" and the inverting gate 24b that outputs the value "0" are commonly connected to the control signal distribution line 25, and a short-circuit current flows from the inverting gate 24a to the inverting gate 24b. For this reason, the power consumption in the vertical drive unit 20 increases. At this time, the control signal distribution line 25 has an intermediate potential between the values "0" and "1", the propagation delay of the control signal increases, and the pixel 100 may malfunction. For this reason, it is necessary to shorten such a period in which the logics of the control signals are different from each other.

Thus, the plurality of transmission paths 222 is arranged in the control signal transmission unit 22 to transmit the control signals respectively, and the logical product operation is performed by the operation unit 23. As a result, it is possible to absorb the difference in delay characteristics of the different transmission paths 222. Furthermore, the delay time can be converged to a specific value by increasing the number of transmission paths 222 in the control signal transmission unit 22. As a result, it is possible to make the delay times uniform in the control signal transmission units 22a and 22b. Details of the operation of the operation unit 23 will be described later.

The control signal output unit 26 converts the control signal distributed for each of the signal lines OFG1 to OFGm into a control signal for the pixel 100 and outputs the control signal. The control signals of digital signals are transmitted to the signal lines OFG1 to OFGm. To perform high speed transmission, the digital signal has a relatively small amplitude. Furthermore, transmission using a differential transmission line or the like may be performed. On the other hand, as described with reference to FIG. 2, the control signals for the pixel 100 are connected to the gates of the MOS transistors arranged in the pixel 100. For this reason, the control signal output unit 26 performs conversion from the digital control signal to a control signal of a voltage for turning on the MOS transistor. Furthermore, the control signal output unit 26 can also amplify the control signal to drive many pixels 100.

Note that, the signal lines OFG1 to OFGm are examples of control signal lines described in the claims.

[Transmission of Control Signal]

Figure 4:
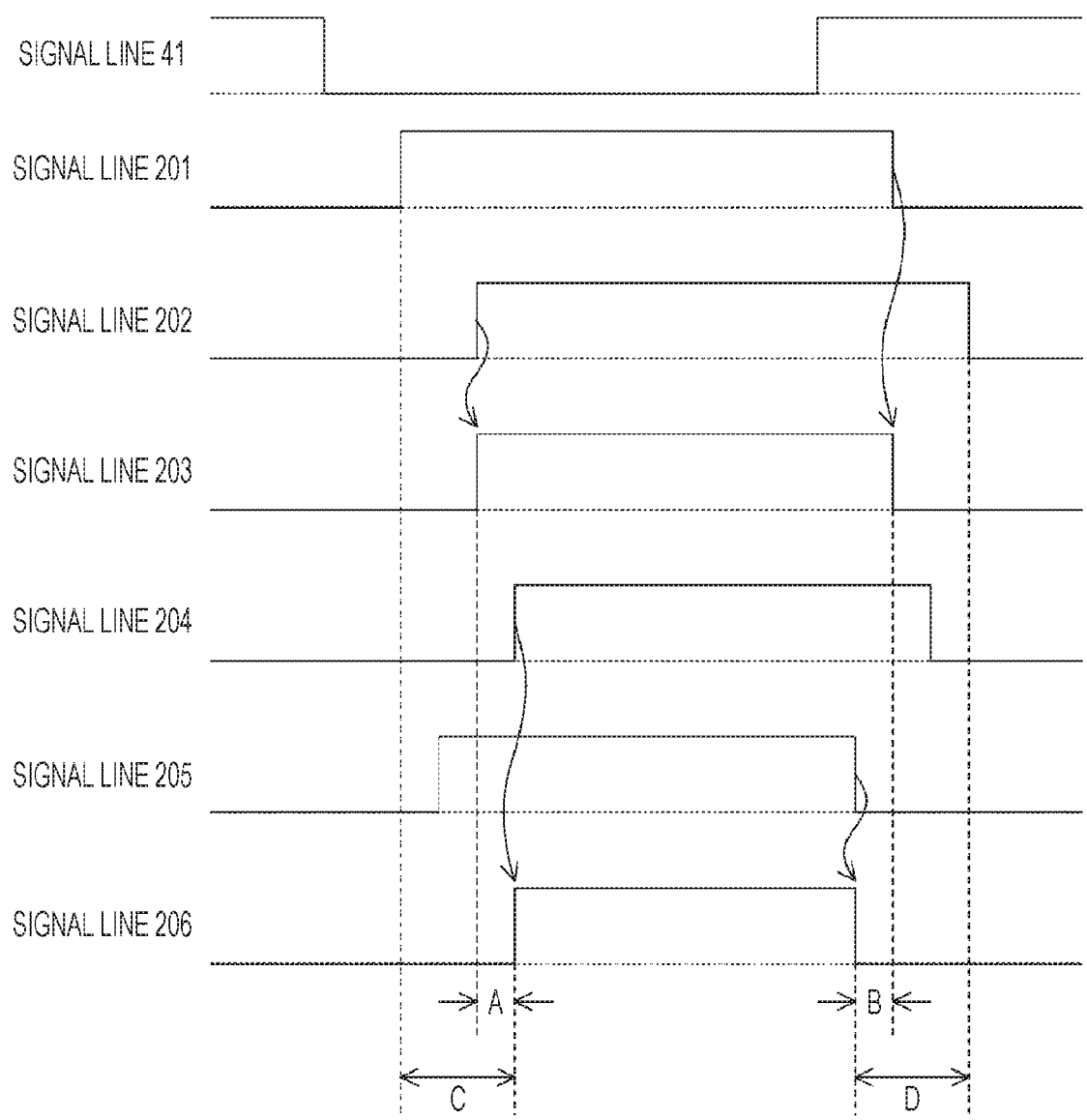
FIG. 4 is a diagram illustrating an example of transmission of control signals according to the first embodiment of the present disclosure.

FIG. 4 is a diagram illustrating an example of transmission of control signals according to the first embodiment of the present disclosure. The figure is a diagram illustrating how control signals are transmitted in the control signal transmission units 22a and 22b and the operation units 23a and 23b, and is a diagram illustrating the control signals transmitted by the signal line 201 and the like described in FIG. 3. In the figure, "signal line 41" represents a control signal input to the vertical drive unit 20 by the signal line 41. Furthermore, "signal line 201" to "signal line 206" represent control signals transmitted by the signal line 201 to the signal line 206, respectively.

The control signal input to the vertical drive unit 20 by the signal line 41 is logically inverted by the inverting gate 21, and input to the control signal transmission units 22a and 22b. The control signals transmitted via the transmission paths 222 of the control signal transmission units 22a and 22b are output to the signal lines 201 and 202 and the signal lines 204 and 205, respectively. As illustrated in the figure, in the control signals output to the signal lines 201 and 202 and the signal lines 204 and 205, the delay times and the pulse widths vary depending on the characteristics of the transmission paths 222 and the like. The logical product operations by the operation units 23a and 23b are performed on these control signals. Signals resulting from the operations performed by the operation units 23a and 23b are output to the signal lines 203 and 206, respectively. The signal output from the operation unit 23 is transmitted to the pixel 100 via the inverting gate 24 and the control signal output unit 26. For the signal, for example, positive logic can be adopted in which the MOS transistor of the pixel 100 is turned on when the value is "1".

Since the operation unit 23 performs the logical product operation, in the rising edge of the input signal of the operation unit 23a (falling edge of the signal on the signal line 41), a control signal is output whose value makes a transition on the basis of rising of the control signal output to the signal line 202. This is because the signal transition on the signal line 202 is later than the signal transition on the signal line 201. On the other hand, in the falling edge of the input signal of the operation unit 23a (rising edge of the signal on the signal line 41), a control signal is output whose value makes a transition on the basis of falling of the control signal output to the signal line 201. This is because the signal transition on the signal line 201 is earlier than the signal transition on the signal line 202. Similarly, in the rising edge of the input of the operation unit 23b, a control signal is output whose value makes a transition on the basis of rising of the control signal output to the signal line 204. In the falling edge of the input of the operation unit 23b, a control signal is output whose value makes a transition on the basis of falling of the control signal output to the signal line 205.

Then, a period of the difference in transition between the control signal output to the signal line 203 and the control signal output to the signal line 206 is a period in which the logics of the control signals in the control signal distribution line 25 are different from each other. As illustrated in the figure, the period in which the logics are different from each other corresponds to a period A in the rising edge, and corresponds to a period B in the falling edge. On the other hand, in the example of the figure, a delay variation of the control signals of the signal lines 201, 202, 204, and 205 is a period C in the rising edge, and is a period D in the falling edge. That is, delays of signals through the four transmission paths 222 of the control signal transmission units 22a and 22b have variations in the periods C and D. By the operation performed by the operation unit 23, the differences between the delay times of the control signals supplied to the control signal distribution line 25 are reduced to A and B, respectively.

[Variation of Delay of Control Signal]

Figure 5:
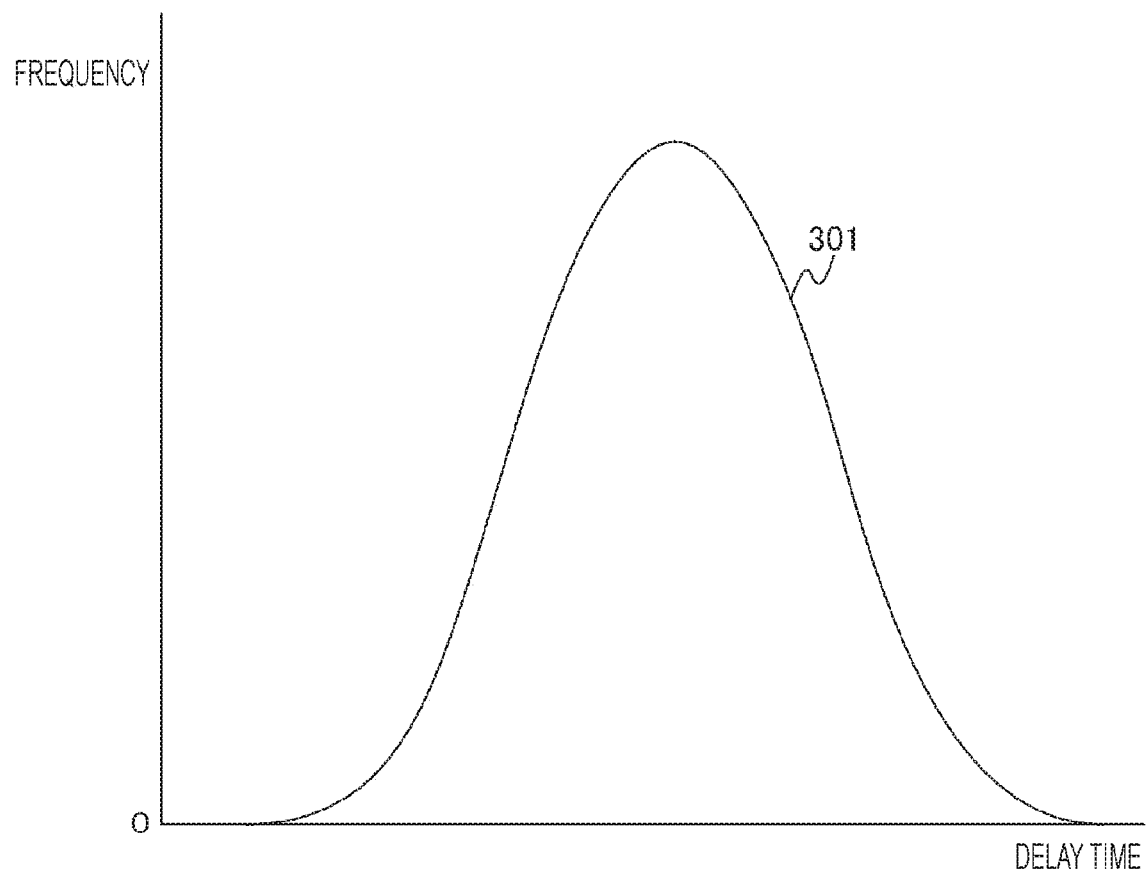
FIG. 5 is a diagram illustrating an example of a delay of a control signal according to the embodiment of the present disclosure.

FIG. 5 is a diagram illustrating an example of a delay of a control signal according to the embodiment of the present disclosure. The figure illustrates a frequency distribution of the delay time of the control signal. A graph 301 in the figure is a graph illustrating a distribution of the delay time of the control signal transmitted through the transmission path 222. As illustrated in the graph 301, the distribution of the delay time is a normal distribution. As described with reference to FIG. 4, the operation unit 23 performs the logical product operation, so that the signal makes a transition on the basis of the longest delay time among the delay times of the plurality of transmission paths 222 in the rising edge. Furthermore, in the falling edge, the signal makes a transition on the basis of the shortest delay time among the delay times of the plurality of transmission paths 222.

In a case where the number of transmission paths 222 arranged in parallel is increased, the delay times in the rising edge and the falling edge converge to the maximum delay time and the minimum delay time in graph 301, respectively. That is, as the number of transmission paths 222 arranged is increased, a deviation of the delay time is absorbed. The period can be shortened in which the logics of the control signals are different from each other, and the short-circuit current can be reduced in the inverting gates 24a and 24b. Furthermore, since the delay times of the control signals of the pixels 100 can be made uniform, a deviation of the imaging timing for each pixel 100 can be reduced, and degradation of the image quality can be prevented.

Note that, in the vertical drive unit 20, a control signal sequentially output for each pixel 100 arranged in the row of the pixel array unit 10, like the control signal transmitted by the signal line SEL, can be generated by, for example, a shift register. The control signal output from the control unit 40 by the shift register arranged in the vertical drive unit 20 can be output for each row of the pixels 100 while being sequentially transferred.

As described above, the imaging device 1 of the first embodiment of the present disclosure transmits the control signal by the plurality of transmission paths 222 in the vertical drive unit 20. The plurality of control signals transmitted is subjected to the operation, and the control signal of the operation result is supplied to each of the both ends of the control signal distribution line 25, and is distributed to the pixels 100. Therefore, the influence can be reduced of the delay at the time of transmission of the control signal.

2. Second Embodiment

In the imaging device 1 of the first embodiment described above, the operation unit 23 of the vertical drive unit 20 performs the logical product operation. On the other hand, the imaging device 1 of a second embodiment of the present disclosure is different from the first embodiment described above in that a logical sum operation is performed.

[Configuration of Vertical Drive Unit]

Figure 6:
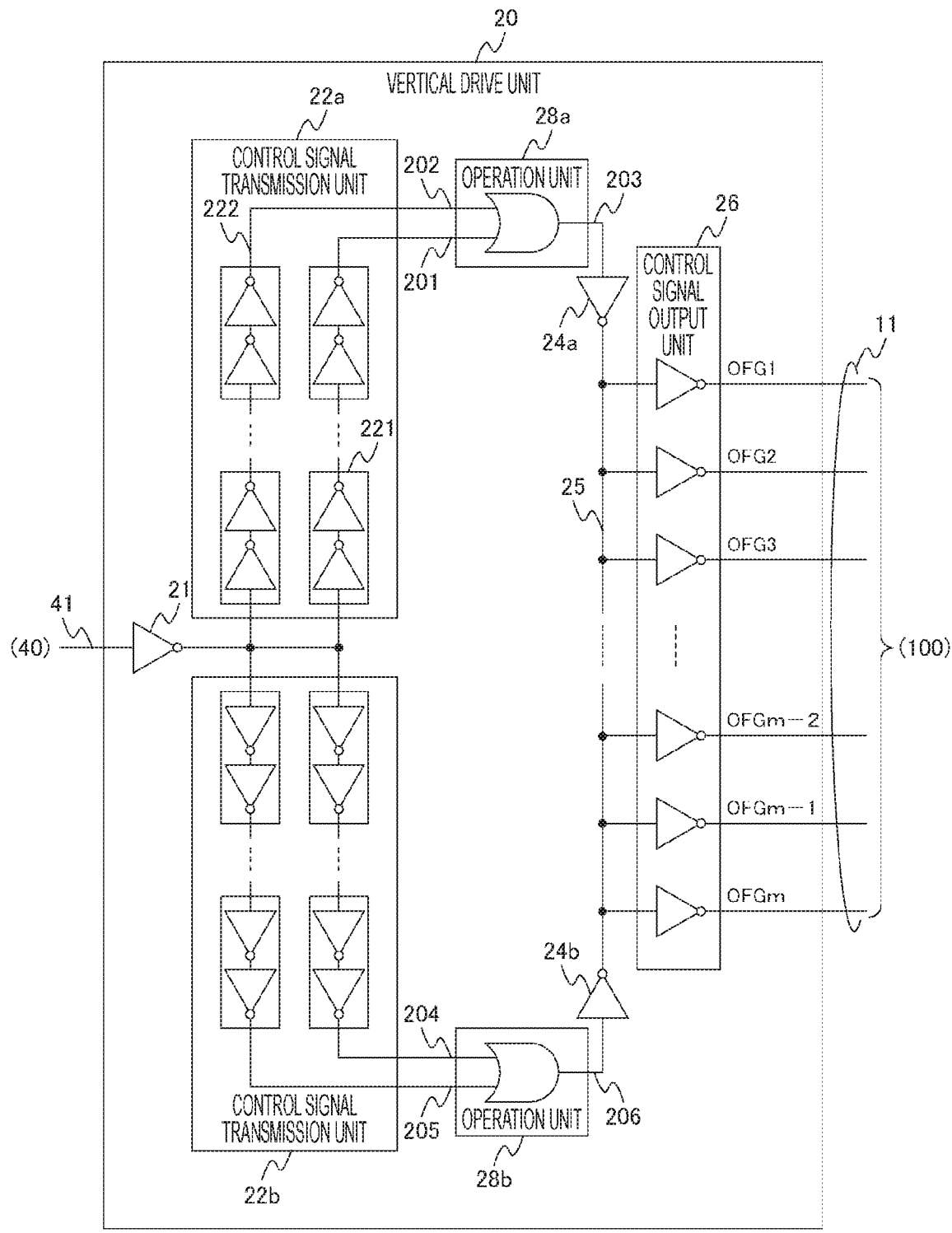
FIG. 6 is a diagram illustrating a configuration example of a vertical drive unit according to a second embodiment of the present disclosure.

FIG. 6 is a diagram illustrating a configuration example of a vertical drive unit according to the second embodiment of the present disclosure. The vertical drive unit 20 in the figure is different from the vertical drive unit 20 described in FIG. 3 in that an operation unit 28 is provided instead of the operation unit 23.

The operation unit 28 performs the logical sum operation as an operation on the control signals transmitted by the plurality of transmission paths 222 of the control signal transmission unit 22. Operation units 28a and 28b in the figure perform operations on the control signals transmitted by the control signal transmission units 22a and 22b, respectively.

[Transmission of Control Signal]

Figure 7:
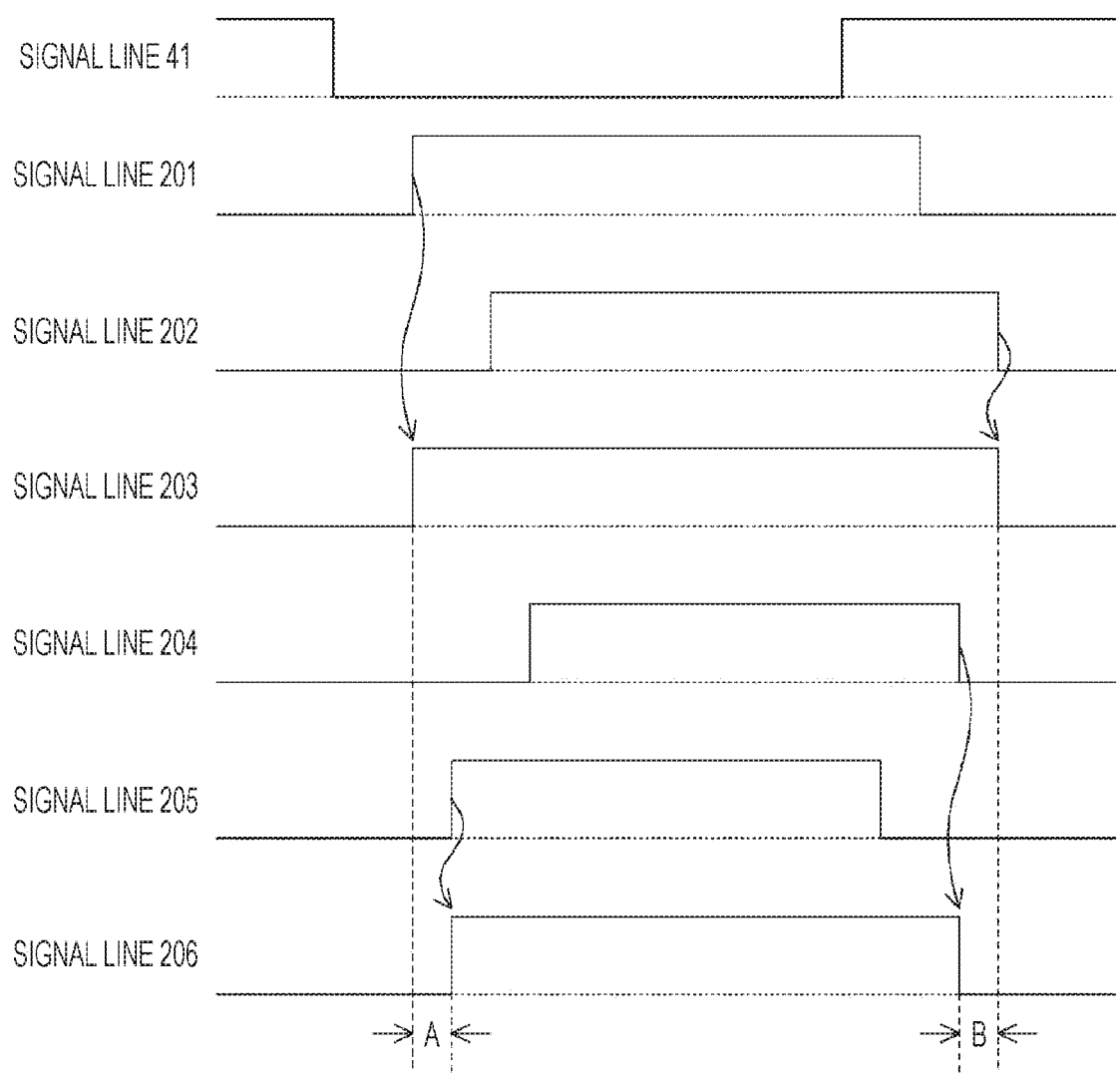
FIG. 7 is a diagram illustrating an example of transmission of control signals according to the second embodiment of the present disclosure.

FIG. 7 is a diagram illustrating an example of transmission of control signals according to the second embodiment of the present disclosure. Note that, it is assumed that the same control signals as in FIG. 3 are transmitted to the signal lines 41, 201, 202, 204, and 205, and are input to the operation units 28a and 28b. Since the operation unit 28 performs the logical sum operation, in the rising edge of the input signal of the operation unit 28a, the control signal output to the signal line 201 makes a transition earlier, so that a control signal is output whose value makes a transition on the basis of rising of that control signal. On the other hand, in the falling edge of the input signal of the operation unit 28a, the control signal output to the signal line 202 makes a transition later, so that a control signal is output whose value makes a transition on the basis of falling of that control signal. Similarly, in the rising edge of the input signal of the operation unit 28b, a control signal is output whose value makes a transition on the basis of rising of the control signal output to the signal line 205. In the falling edge of the input signal of the operation unit 28b, a control signal is output whose value makes a transition on the basis of falling of the control signal output to the signal line 204.

Since the operation unit 28 performs the logical sum operation, the signal makes a transition on the basis of the shortest delay time among the delay times of the plurality of transmission paths 222 in the rising edge. Furthermore, in the falling edge, the signal makes a transition on the basis of the longest delay time among the delay times of the plurality of transmission paths 222. For this reason, as the number of transmission paths 222 arranged in parallel increases, the delay times in the rising edge and the falling edge converge to the minimum delay time and the maximum delay time in graph 301, respectively. By increasing the number of transmission paths 222 arranged, a deviation of the delay time is absorbed, and a period can be shortened in which the logics of the control signals are different from each other.

The configuration of the imaging device 1 other than this is similar to the configuration of the imaging device 1 described in the first embodiment of the present disclosure, and thus the description thereof will be omitted.

As described above, the imaging device 1 of the second embodiment of the present disclosure performs the logical sum operation as an operation on the control signals transmitted by the plurality of transmission paths 222, whereby a difference between the delay times of the control signals is absorbed. Therefore, the influence can be reduced of the delay at the time of transmission of the control signal.

3. Third Embodiment

In the imaging device 1 of the first embodiment described above, the operation unit 23 of the vertical drive unit 20 performs the logical product operation. On the other hand, the imaging device 1 of a third embodiment of the present disclosure is different from the first embodiment described above in that a majority operation is performed.

[Configuration of Vertical Drive Unit]

Figure 8:
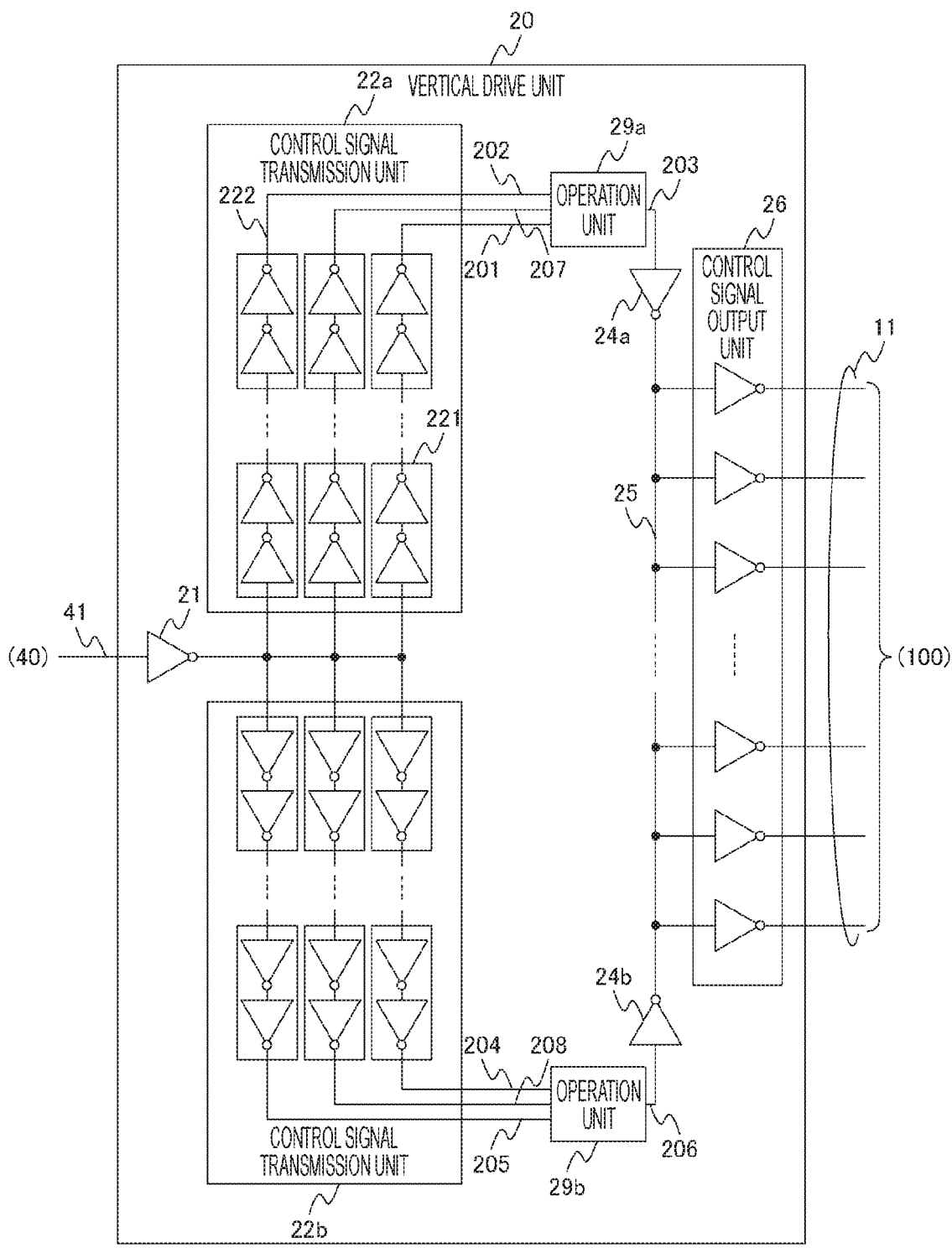
FIG. 8 is a diagram illustrating a configuration example of a vertical drive unit according to a third embodiment of the present disclosure.

FIG. 8 is a diagram illustrating a configuration example of a vertical drive unit according to the third embodiment of the present disclosure. The vertical drive unit 20 in the figure is different from the vertical drive unit 20 described in FIG. 3 in that an operation unit 29 is provided instead of the operation unit 23. Furthermore, the control signal output units 22*a* and 22*b* in the figure each include three transmission paths 222 each including the signal shaping unit 221.

The operation unit 29 performs the majority operation as an operation on the control signals transmitted by the plurality of transmission paths 222 of the control signal transmission unit 22. Operation units 29*a* and 29*b* in the figure respectively perform majority operations on the three control signals transmitted by the control signal transmission units 22*a* and 22*b*. Here, the majority operation is an operation in which the output has the logic "1" when more than half of the input signals have the logic "1".

[Configuration of Vertical Drive Unit]

Figure 9:
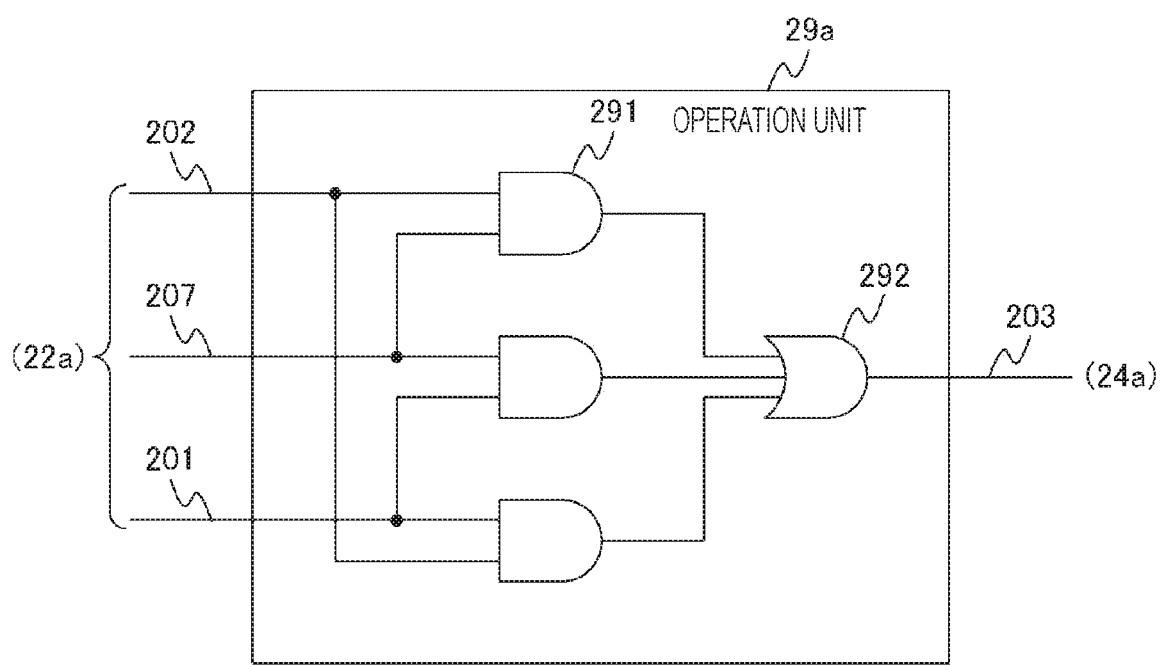
FIG. 9 is a diagram illustrating a configuration example of an operation unit according to the third embodiment of the present disclosure.

FIG. 9 is a diagram illustrating a configuration example of the operation unit according to the third embodiment of the present disclosure. The figure is a diagram illustrating a configuration example of the operation unit 29*a*. As illustrated in the figure, the operation unit 29 can include three logical product gates 291 and a logical sum gate 292, and the value "1" is output to the signal line 203 when at least two of signals input by the signal lines 201, 202, and 207 have the value "1". For this reason, in the distribution of the delay time described in FIG. 5, the delay of the control signal can be converged to the delay time near the apex of the graph 301.

[Transmission of Control Signal]

Figure 10:
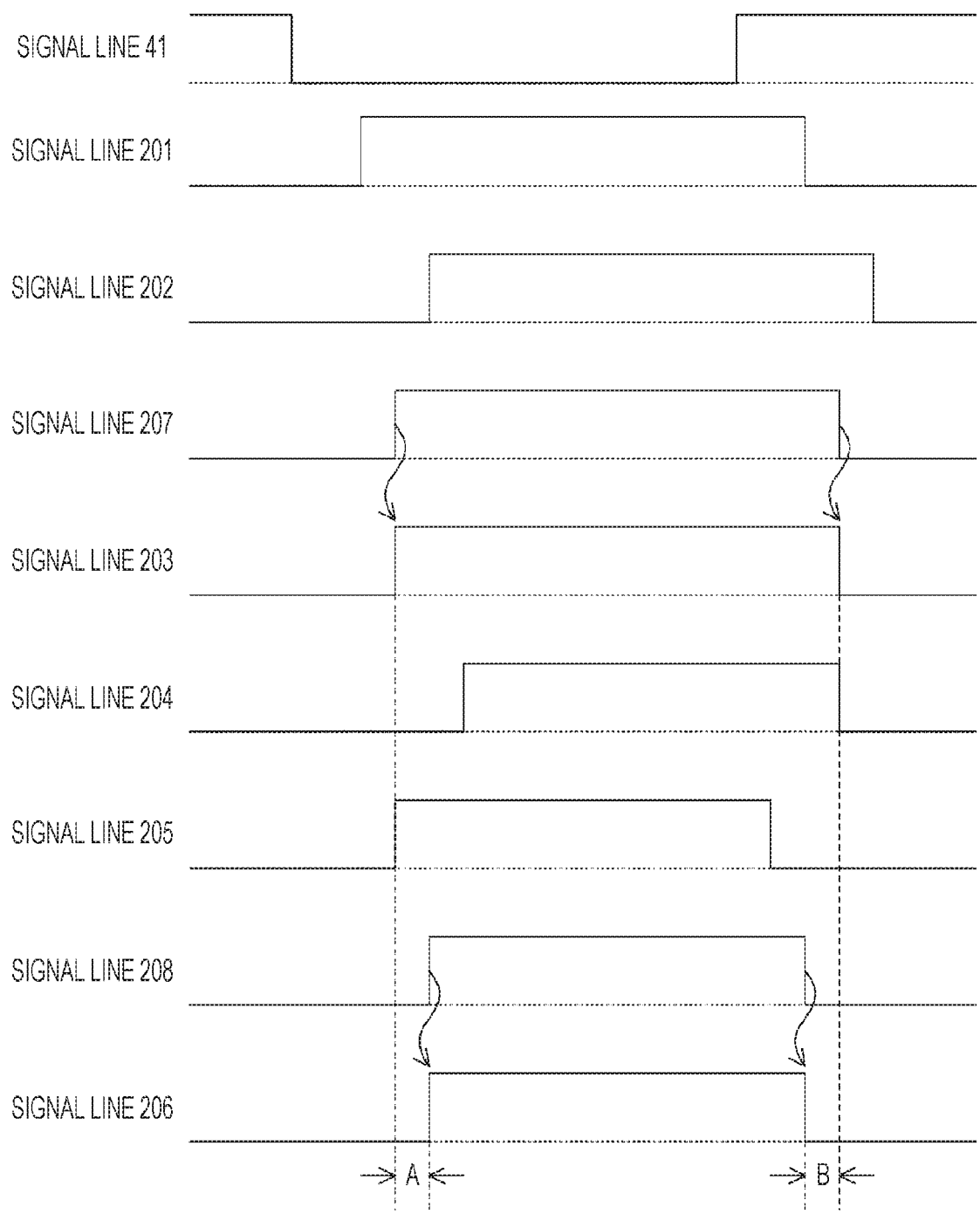
FIG. 10 is a diagram illustrating an example of transmission of control signals according to the third embodiment of the present disclosure.

FIG. 10 is a diagram illustrating an example of transmission of control signals according to the third embodiment of the present disclosure. Note that, "signal line 207" and "signal line 208" represent control signals transmitted by the signal line 207 and the signal line 208, respectively. Since the operation unit 28 performs the majority operation, in the rising edge of the input signal of the operation unit 29*a*, a control signal is output whose value makes a transition on the basis of rising of the second input signal of the three inputs. Similarly, in the falling edge of the input signal of the operation unit 29*a*, a control signal is output whose value makes a transition on the basis of falling of the second input signal of the three inputs. In the figure, in both the rising and the falling, a control signal is output whose value makes a transition on the basis of the control signal output to the signal line 207 having a medium delay time among the three signals. Similarly, in the operation unit 29*b*, a control signal is output whose value makes a transition on the basis of the control signal output to the signal line 208 having a medium delay time among the three signals.

As described above, since the operation unit 29 performs the majority operation, the delay times in the rising edge and the falling edge converge to the delay times most distributed in the graph 301, respectively. By increasing the number of transmission paths 222 arranged, a deviation of the delay time is absorbed, and a period can be shortened in which the logics of the control signals are different from each other.

The configuration of the imaging device 1 other than this is similar to the configuration of the imaging device 1 described in the first embodiment of the present disclosure, and thus the description thereof will be omitted.

As described above, the imaging device 1 of the third embodiment of the present disclosure performs the majority operation as an operation on the control signals transmitted by the plurality of transmission paths 222, whereby a difference between the delay times of the control signals is absorbed. Therefore, the influence can be reduced of the delay at the time of transmission of the control signal.

<4. Configuration of Solid-State Imaging Device>

Figure 11:
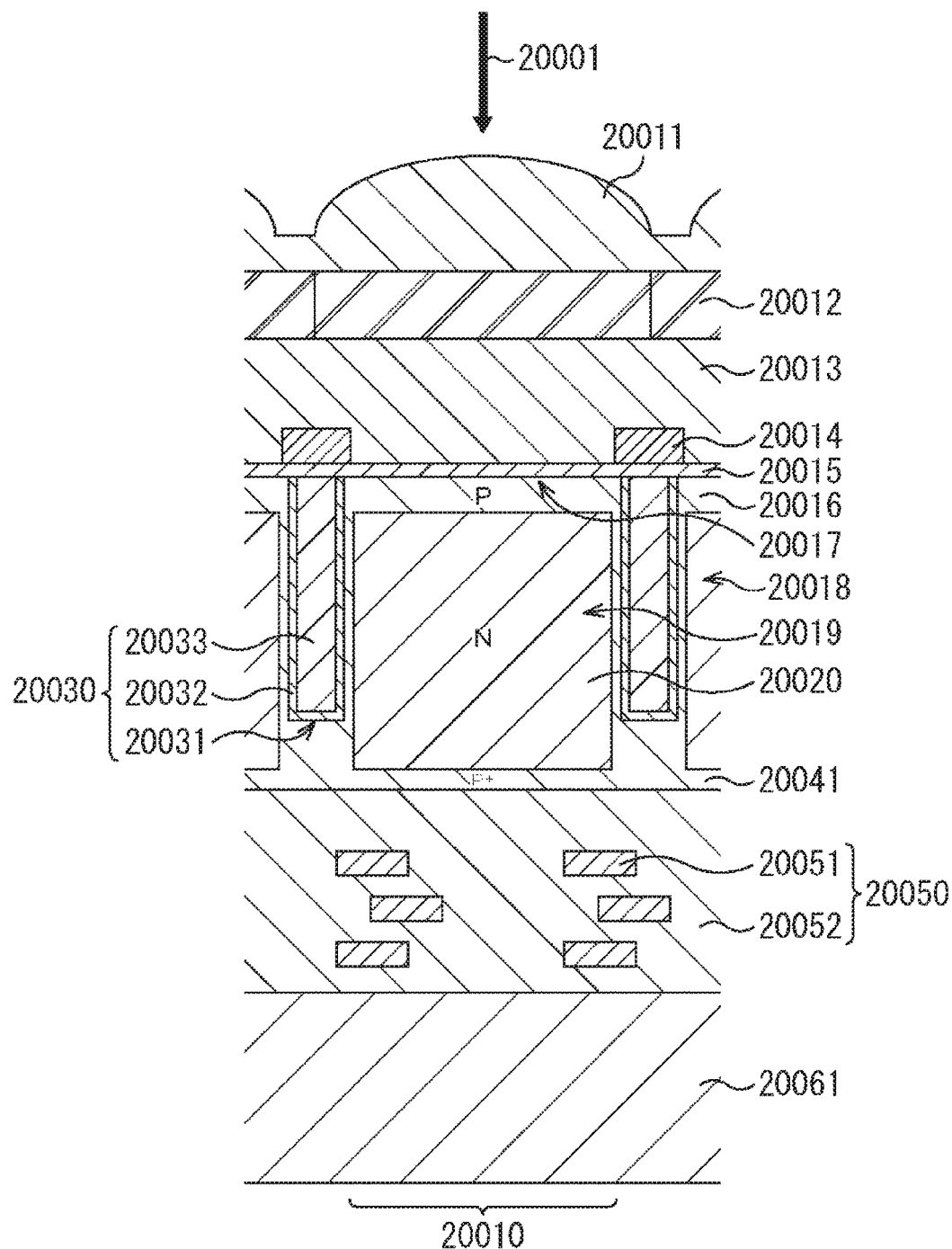
FIG. 11 is a cross-sectional view illustrating a configuration example of a solid-state imaging device that can be applied to the imaging device of the present disclosure.

FIG. 11 is a cross-sectional view illustrating a configuration example of a solid-state imaging device that can be applied to the imaging device of the present disclosure.

In the solid-state imaging device, a photodiode (PD) 20019 receives incident light 20001 incident from the back surface (the upper surface in the figure) side of a semiconductor substrate 20018. Above the PD 20019, a planarizing film 20013, a color filter (CF) 20012, and a microlens 20011 are provided, and the incident light 20001 incident via each portion in order is received by a light-receiving surface 20017 and photoelectrically converted.

For example, in the PD 20019, an n-type semiconductor region 20020 is formed as a charge storage region for storing charges (electrons). In the PD 20019, the n-type semiconductor region 20020 is provided inside p-type semiconductor regions 20016 and 20041 of the semiconductor substrate 20018. On the front surface (lower surface) side of the semiconductor substrate 20018 of the n-type semiconductor region 20020, the p-type semiconductor region 20041 is provided having a higher impurity concentration than the back surface (upper surface) side. That is, the PD 20019 has a Hole-Accumulation Diode (HAD) structure, and the p-type semiconductor regions 20016 and 20041 are formed to suppress generation of a dark current at each interface with the upper surface side and the lower surface side of the n-type semiconductor region 20020.

In the inside of the semiconductor substrate 20018, a pixel separation portion 20030 is provided that electrically separates a plurality of pixels 20010 from each other, and the PD 20019 is provided in a region partitioned by the pixel separation portion 20030. In the figure, in a case where the solid-state imaging device is viewed from the upper surface side, the pixel separation portion 20030 is formed in a lattice shape to be interposed between the plurality of pixels 20010, for example, and the PD 20019 is formed in the region partitioned by the pixel separation portion 20030.

In each PD 20019, the anode is grounded, and in the solid-state imaging device, signal charges stored by the PD 20019 (for example, electrons) are read via a transfer transistor (MOS FET) or the like not illustrated, and output as an electric signal to a vertical signal line (VSL) not illustrated.

A wiring layer 20050 is provided on the front surface (lower surface) that is an opposite side of the semiconductor substrate 20018 from the back surface (upper surface) on which portions such as a light-shielding film 20014, the CF 20012, and the microlens 20011 are provided.

The wiring layer 20050 includes a wiring line 20051 and an insulating layer 20052, and is formed so that the wiring line 20051 is electrically connected to each element, in the insulating layer 20052. The wiring layer 20050 is a so-called multilayer wiring layer, and is formed including the wiring line 20051, and an interlayer insulating film constituting the insulating layer 20052 alternately stacked plural times. Here, as the wiring line 20051, wiring lines, such as a wiring line to a transistor such as a transfer transistor for reading the charges from the PD 20019, and the VSL, are stacked with an insulating layer 20052 interposed therebetween.

A support substrate 20061 is provided on a surface of an opposite side of the wiring layer 20050 from a side on which the PD 20019 is provided. For example, a substrate of a silicon semiconductor with a thickness of several hundred μm is provided as the support substrate 20061.

The light-shielding film 20014 is provided on the back surface (the upper surface in the figure) side of the semiconductor substrate 20018.

The light-shielding film 20014 shields part of the incident light 20001 traveling from above the semiconductor substrate 20018 to the back surface of the semiconductor substrate 20018.

The light-shielding film 20014 is provided above the pixel separation portion 20030 provided inside the semiconductor substrate 20018. Here, the light-shielding film 20014 is provided on the back surface (upper surface) of the semiconductor substrate 20018 to protrude in a convex shape with an insulating film 20015 such as a silicon oxide film interposed therebetween. On the other hand, above the PD 20019 provided inside the semiconductor substrate 20018, the light-shielding film 20014 is not provided but is open so that the incident light 20001 is incident on the PD 20019.

That is, in a case where the solid-state imaging device is viewed from the upper surface side in the figure, the planar shape of the light-shielding film 20014 is a lattice shape, and an opening is formed through which the incident light 20001 passes to the light-receiving surface 20017.

The light-shielding film 20014 includes a light-shielding material that shields light. For example, a light-shielding film 20014 is formed by sequentially stacking a titanium (Ti) film and a tungsten (W) film. In addition, the light-shielding film 20014 can be formed by, for example, sequentially stacking a titanium nitride (TiN) film and a tungsten (W) film.

The light-shielding film 20014 is covered with the planarizing film 20013. The planarizing film 20013 is formed by using an insulating material that transmits light.

The pixel separation portion 20030 includes a groove portion 20031, a fixed charge film 20032, and an insulating film 20033.

The fixed charge film 20032 is formed in the back surface (upper surface) side of the semiconductor substrate 20018 to cover the groove portion 20031 that partitions the plurality of pixels 20010.

Specifically, the fixed charge film 20032 is provided to cover the inner surface of the groove portion 20031 formed in the back surface (upper surface) side in the semiconductor substrate 20018 with a constant thickness. Then, the insulating film 20033 is provided (filled) to fill the inside of the groove portion 20031 covered with the fixed charge film 20032.

Here, the fixed charge film 20032 is formed by using a high dielectric substance having negative fixed charges so that a positive charge (hole) storage region is formed at an interface portion with the semiconductor substrate 20018 and generation of a dark current is suppressed. The fixed charge film 20032 is formed to have negative fixed charges, whereby an electric field is applied to the interface with the semiconductor substrate 20018 by the negative fixed charges, and the positive charge (hole) storage region is formed.

The fixed charge film 20032 can include, for example, a hafnium oxide film (HfO2 film). Furthermore, in addition, for example, the fixed charge film 20032 can be formed to contain at least one of oxides such as hafnium, zirconium, aluminum, tantalum, titanium, magnesium, yttrium, or a lanthanoid element.

The solid-state imaging device as described above can be applied to the present disclosure.

5. Application Example to Stacked Imaging Device

Figure 12A:
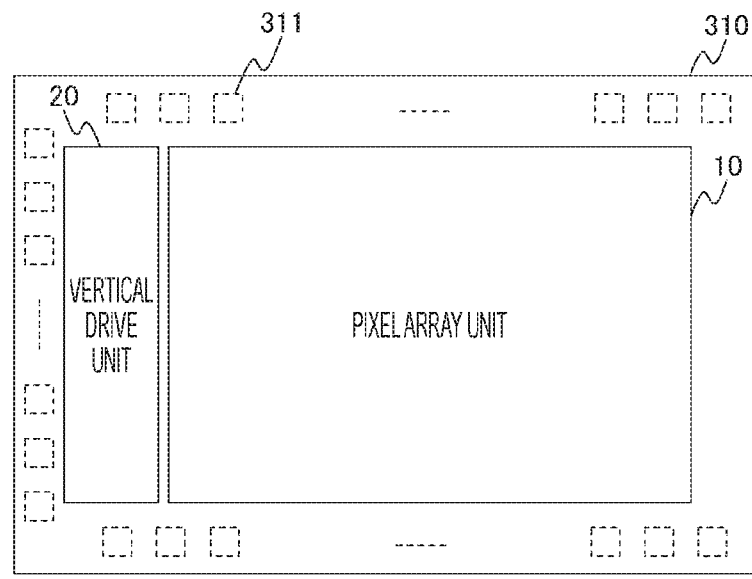
FIGS. 12A, 12B, and 12C are diagrams illustrating a configuration example of the imaging device of the present disclosure.
Figure 12B:
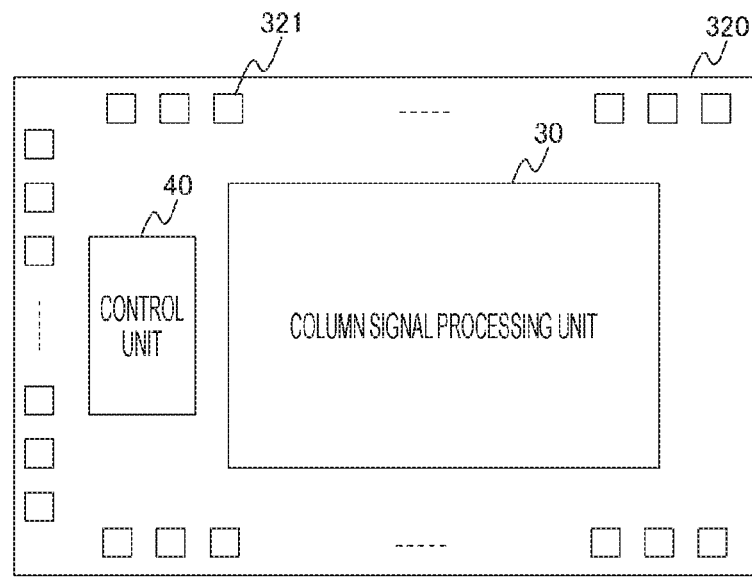
Figure 12C:
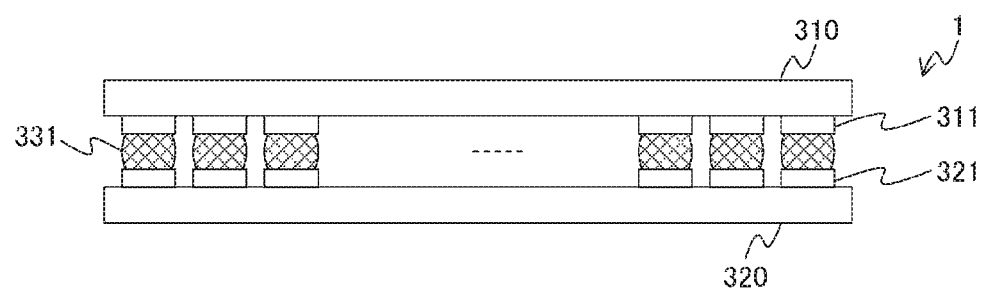

FIGS. 12A, 12B, and 12C are diagrams illustrating a configuration example of the imaging device of the present disclosure. The figure is a diagram illustrating an example of the imaging device 1 including two semiconductor chips stacked together. The imaging device 1 in the figure includes a pixel chip 310 and a signal processing chip 320.

FIG. 12A is a diagram illustrating a configuration of the pixel chip 310. In the pixel chip 310 of FIG. 12A, the pixel array unit 10 and the vertical drive unit 20 described in FIG. 1, and a pad 311 are arranged. The pad 311 is an electrode that transmits an image signal and the like to and from the signal processing chip 320 described later. A plurality of the pads 311 is arranged in a peripheral portion of the back surface of the pixel chip 310.

FIG. 12B is a diagram illustrating a configuration of the signal processing chip 320. In the signal processing chip 320 of FIG. 12B, the column signal processing unit 30 and the control unit 40 described in FIG. 1, and pads 321 are arranged. The pads 321 are arranged in a one-to-one correspondence with the pads 311 described above, and transmit electric signals. Note that, the column signal processing unit 30 and the control unit 40 constitute a signal processing circuit.

FIG. 12C side view illustrating the imaging device 1 including the pixel chip 310 and the signal processing chip 320. As illustrated in FIG. 12C, the imaging device 1 includes the signal processing chip 320 and the pixel chip 310 stacked thereon. At the time of stacking, the pads 311 and 321 are aligned and connected together with solder 331. As a result, the pads 311 and 321 constitute part of the signal lines 11 and 12 described in FIG. 1.

As illustrated in the figure, the pixel array unit 10, the vertical drive unit 20, the column signal processing unit 30, and the control unit 40 described in FIG. 1 are arranged separately in two semiconductor chips, and these chips are stacked together, whereby the imaging device 1 can be formed. In the pixel array unit 10, analog image signal generation process is performed. The process in the pixel array unit 10 is a relatively low speed process. On the other hand, the column signal processing unit 30 performs analog-to-digital conversion of the image signal, and further performs a process of the converted digital image signal. For this reason, the column signal processing unit 30 performs a relatively high speed process. Thus, by forming these on different semiconductor chips, it is possible to form a semiconductor chip to which an optimum process is applied for each process.

Note that, as described in FIG. 1, the control unit 40 and the vertical drive unit 20 are connected together by the signal line 41. The pads 311 and 322 constituting the signal line 41 are preferably arranged near the central portion of the vertical drive unit 20 in the figure. This is because, as described with reference to FIG. 3, the paths from the signal line 41 to the both ends of the control signal distribution line 25 are symmetrical with each other, and the delay times of the control signals at the both ends of the control signal distribution line 25 are substantially equal to each other.

As described above, by forming the imaging device 1 with a plurality of semiconductor chips, the degree of freedom is improved in arrangement of the pixel array unit 10 and the like described in FIG. 1, and the configuration of the imaging device 1 can be optimized.

6. Application Example to Camera

The present disclosure can be applied to various products. For example, the present disclosure may be implemented as an imaging element mounted on an imaging device such as a camera.

Figure 13:
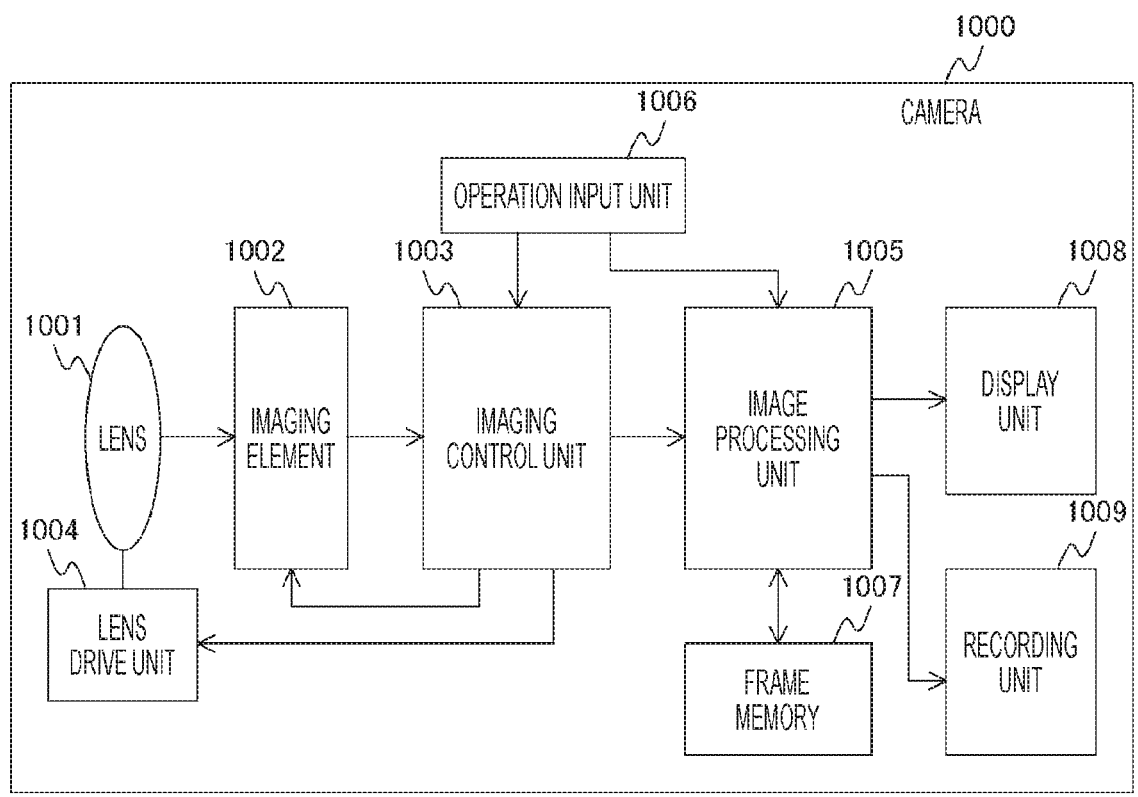
FIG. 13 is a block diagram illustrating a schematic configuration example of a camera that is an example of an imaging device to which the present disclosure can be applied.

FIG. 13 is a block diagram illustrating a schematic configuration example of a camera that is an example of an imaging device to which the present disclosure can be applied. A camera 1000 in the figure includes a lens 1001, an imaging element 1002, an imaging control unit 1003, a lens drive unit 1004, an image processing unit 1005, an operation input unit 1006, a frame memory 1007, a display unit 1008, and a recording unit 1009.

The lens 1001 is an imaging lens of the camera 1000. The lens 1001 focuses light from a subject, and causes the light to be incident on the imaging element 1002 described later to form an image of the subject.

The imaging element 1002 is a semiconductor element that captures the light from the subject focused by the lens 1001. The imaging element 1002 generates an analog image signal depending on light with which the imaging element 1002 is irradiated, converts the image signal into a digital image signal, and outputs the digital image signal.

The imaging control unit 1003 controls imaging in the imaging element 1002. The imaging control unit 1003 controls the imaging element 1002 by generating a control signal and outputting the control signal to the imaging element 1002. Furthermore, the imaging control unit 1003 can perform autofocus in the camera 1000 on the basis of the image signal output from the imaging element 1002. Here, the autofocus is a system that detects a focal position of the lens 1001 and automatically performs adjustment. As the autofocus, a method (image plane phase difference autofocus) can be used of detecting the focal position by detecting an image plane phase difference by a phase difference pixel arranged in the imaging element 1002. Furthermore, a method (contrast autofocus) can be applied of detecting a position where the contrast of an image is the highest as a focal position. The imaging control unit 1003 performs autofocus by adjusting a position of the lens 1001 through the lens drive unit 1004 on the basis of the detected focal position. Note that, the imaging control unit 1003 can include, for example, a Digital Signal Processor (DSP) in which firmware is installed.

The lens drive unit 1004 drives the lens 1001 on the basis of the control of the imaging control unit 1003. The lens drive unit 1004 can drive the lens 1001 by changing the position of the lens 1001 by using a built-in motor.

The image processing unit 1005 performs processing on the image signal generated by the imaging element 1002. The processing includes, for example, demosaicing for generating an image signal of a lacking color among image signals corresponding to red, green, and blue for each pixel, noise reduction for removing noise of the image signal, encoding of the image signal, and the like. The image processing unit 1005 can include, for example, a microprocessor in which firmware is installed.

The operation input unit 1006 accepts an operation input from a user of the camera 1000. As the operation input unit 1006, for example, a push button or a touch panel can be used. The operation input accepted by the operation input unit 1006 is transmitted to the imaging control unit 1003 and the image processing unit 1005. Thereafter, processing is started depending on the operation input, for example, processing such as imaging of the subject.

The frame memory 1007 is a memory that stores a frame that is an image signal for one screen. The frame memory 1007 is controlled by the image processing unit 1005, and holds frames in the course of image processing.

The display unit 1008 displays an image processed by the image processing unit 1005. For the display unit 1008, for example, a liquid crystal panel can be used.

The recording unit 1009 records the image processed by the image processing unit 1005. As the recording unit 1009, for example, a memory card or a hard disk can be used.

In the above, the camera has been described to which the present invention can be applied. The present technology can be applied to the imaging element 1002, in the configuration described above. Specifically, the imaging device 1 described in FIG. 1 can be applied to the imaging element 1002. By applying the imaging device 1 to the imaging element 1002, the influence of the delay of the control signal of the pixel 100 can be reduced, and the degradation of the image quality can be prevented.

Note that, here, the camera has been described as an example; however, in addition, the technology according to the present invention may be applied to, for example, a monitoring device or the like.

7. Application Example to Endoscopic Surgical System

The technology according to the present disclosure can be applied to various products. For example, the technology according to the present disclosure may be applied to an endoscopic surgical system.

Figure 14:
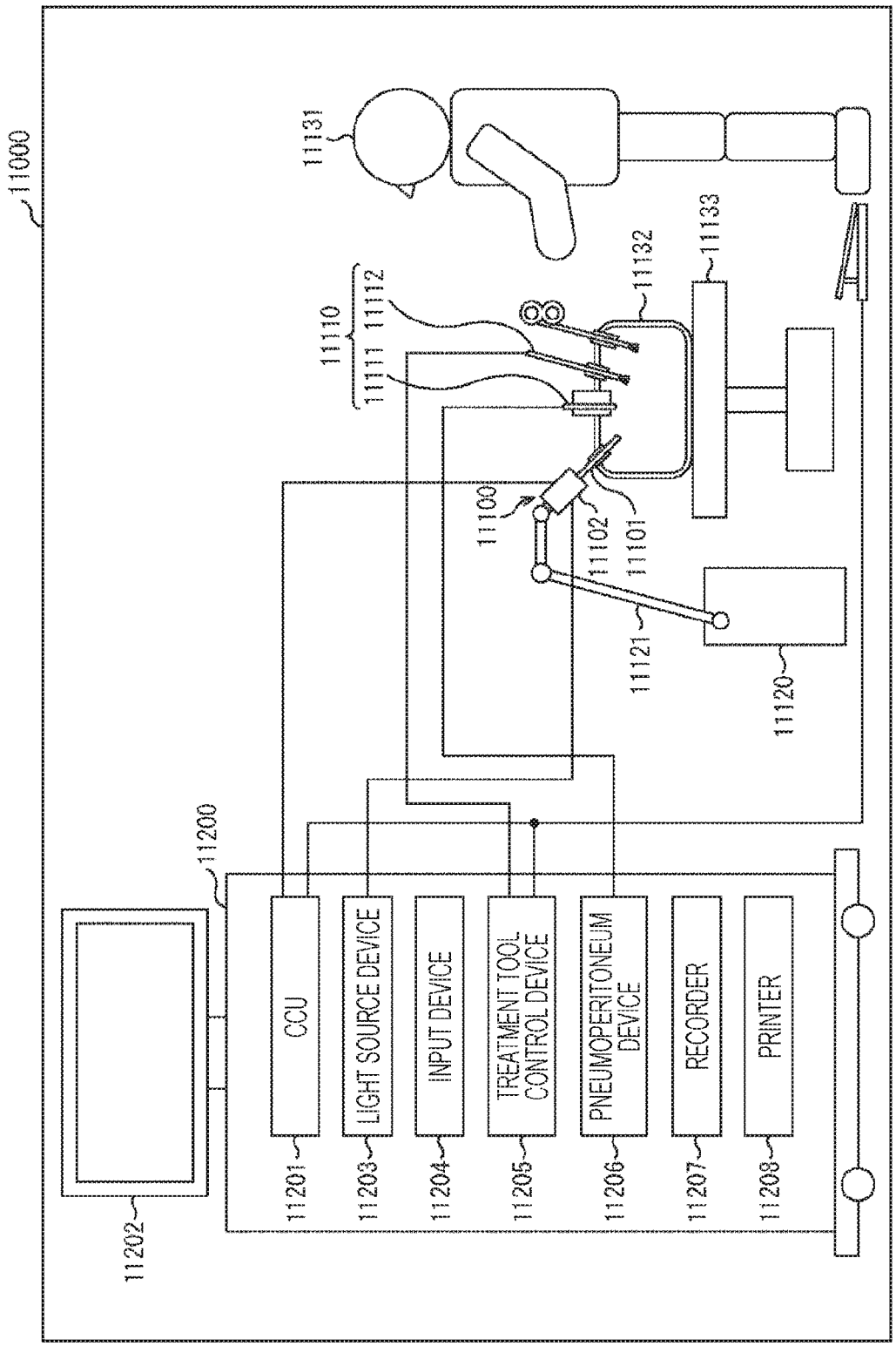
FIG. 14 is a diagram illustrating an example of a schematic configuration of an endoscopic surgical system.

FIG. 14 is a diagram illustrating an example of a schematic configuration of an endoscopic surgical system to which the technology according to the present disclosure can be applied.

In 10, a state is illustrated in which an operator (surgeon) 11131 is performing surgery on a patient 11132 on a patient bed 11133 using an endoscopic surgical system 11000. As illustrated, the endoscopic surgical system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 in which a region of a predetermined length from the distal end is inserted into the body cavity of the patient 11132, and a camera head 11102 connected to the proximal end of the lens barrel 11101. In the illustrated example, the endoscope 11100 formed as a so-called rigid scope including a rigid lens barrel 11101 is illustrated, but the endoscope 11100 may be formed as a so-called flexible scope including a flexible lens barrel.

At the distal end of the lens barrel 11101, an opening is provided into which an objective lens is fitted. A light source device 11203 is connected to the endoscope 11100, and light generated by the light source device 11203 is guided to the distal end of the lens barrel by a light guide extending inside the lens barrel 11101, and the light is emitted toward an observation target in the body cavity of the patient 11132 via the objective lens. Note that, the endoscope 11100 may be a forward-viewing endoscope, an oblique-viewing endoscope, or a side-viewing endoscope.

An optical system and an imaging element are provided inside the camera head 11102, and reflected light (observation light) from the observation target is focused on the imaging element by the optical system. The observation light is photoelectrically converted by the imaging element, and an electric signal corresponding to the observation light, that is, an image signal corresponding to the observation image is generated. The image signal is transmitted as RAW data to a camera control unit (CCU) 11201.

The CCU 11201 includes a central processing unit (CPU), a graphics processing unit (GPU), and the like, and comprehensively controls operation of the endoscope 11100 and a display device 11202. Moreover, the CCU 11201 receives the image signal from the camera head 11102 and applies various types of image processing to the image signal, for example, development processing (demosaic processing), and the like, for displaying the image based on the image signal.

The display device 11202 displays an image based on the image signal subjected to the image processing by the CCU 11201, by the control from the CCU 11201.

The light source device 11203 includes a light source, for example, a light emitting diode (LED) or the like, and supplies irradiation light for imaging a surgical portion or the like to the endoscope 11100.

An input device 11204 is an input interface to the endoscopic surgical system 11000. A user can input various types of information and instructions to the endoscopic surgical system 11000 via the input device 11204. For example, the user inputs an instruction or the like to change imaging conditions (type of irradiation light, magnification, focal length, and the like) for the endoscope 11100.

A treatment tool control device 11205 controls drive of the energy treatment tool 11112 for cauterization of tissue, incision, sealing of blood vessels, or the like. A pneumoperitoneum device 11206 injects a gas into the body cavity of the patient 11132 via the pneumoperitoneum tube 11111 to inflate the body cavity, for the purpose of ensuring a field of view by the endoscope 11100 and securing a working space of the operator. A recorder 11207 is a device capable of recording various types of information regarding surgery. A printer 11208 is a device capable of printing various types of information regarding surgery in various formats such as text, image, graph, and the like.

Note that, the light source device 11203 that supplies irradiation light for imaging a surgical portion to the endoscope 11100 can include a white light source including, for example, an LED, a laser light source, or a combination thereof. In a case where the white light source includes a combination of R, G, and B laser light sources, the output intensity and the output timing of each color (each wavelength) can be controlled with high accuracy, so that adjustment can be performed of the white balance of the captured image in the light source device 11203. Furthermore, in this case, it is also possible to capture an image corresponding to each of R, G, and B in time division by emitting the laser light from each of the R, G, and B laser light sources in time division to the observation target, and controlling drive of the imaging element of the camera head 11102 in synchronization with the emission timing. According to this method, a color image can be obtained without providing a color filter in the imaging element.

Furthermore, drive of the light source device 11203 may be controlled such that the intensity of light to be output is changed at predetermined time intervals. By controlling the drive of the imaging element of the camera head 11102 in synchronization with the change timing of the light intensity to acquire images in time division, and synthesizing the images, a high dynamic range image can be generated without so-called blocked up shadows or blown out highlights.

Furthermore, the light source device 11203 may be able to supply light of a predetermined wavelength band corresponding to special light observation. In the special light observation, for example, by using wavelength dependence of light absorption in a body tissue, by emitting narrow band light compared to irradiation light (in other words, white light) at the time of ordinary observation, so-called narrow band imaging is performed in which a predetermined tissue such as a blood vessel in a mucosal surface layer is imaged with high contrast. Alternatively, in the special light observation, fluorescence observation may be performed that obtain an image by fluorescence generated by emitting excitation light. In the fluorescence observation, it is possible to irradiate a body tissue with excitation light to observe the fluorescence from the body tissue (autofluorescence observation), or to locally inject a reagent such as indocyanine green (ICG) into a body tissue and irradiate the body tissue with excitation light corresponding to the fluorescence wavelength of the reagent to obtain a fluorescent image, for example. The light source device 11203 may be able to supply narrow band light and/or excitation light corresponding to such special light observation.

Figure 15:
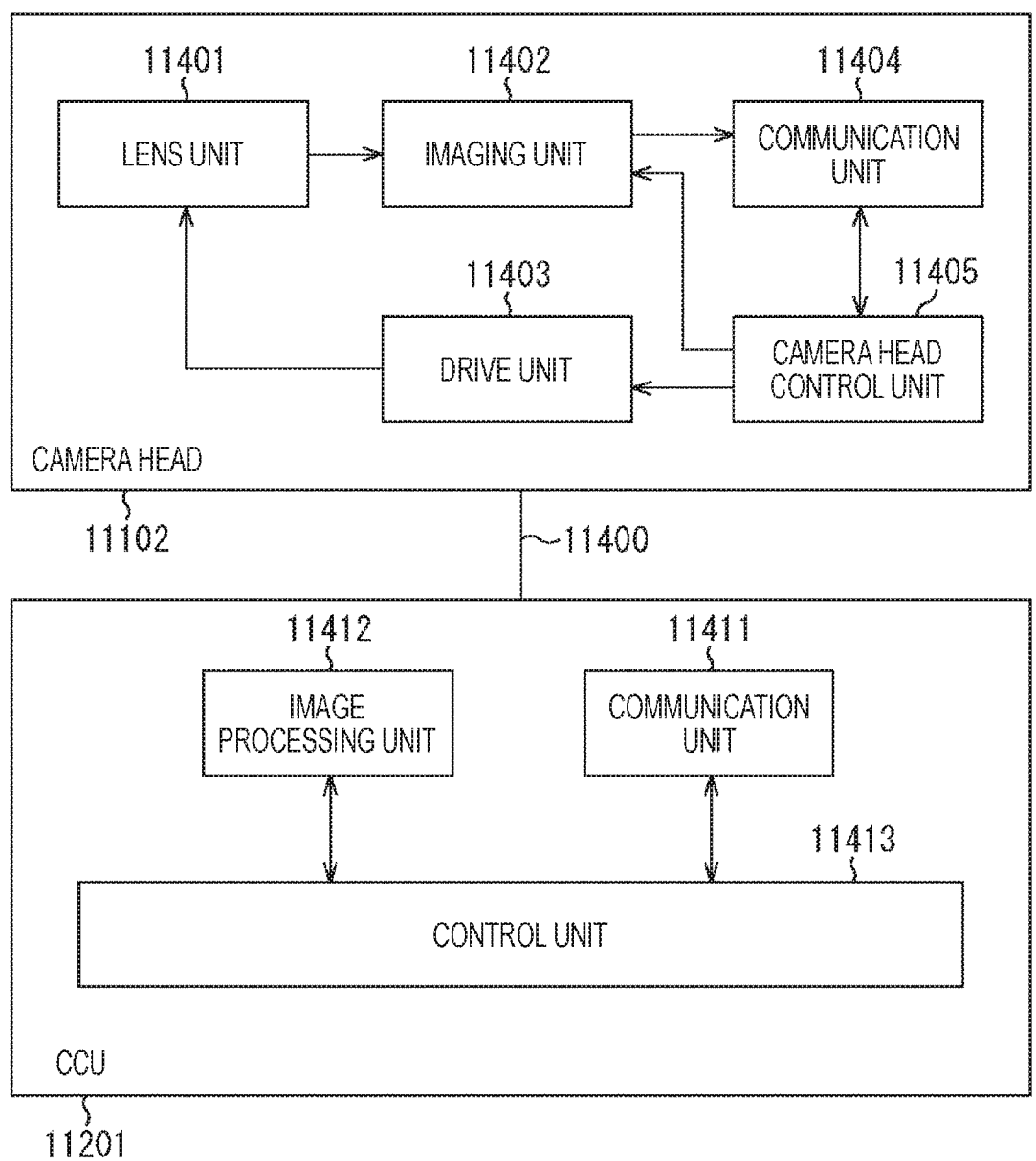
FIG. 15 is a block diagram illustrating an example of a functional configuration of a camera head and a CCU.

FIG. 15 is a block diagram illustrating an example of a functional configuration of the camera head 11102 and the CCU 11201 illustrated in FIG. 14.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. The observation light taken in from the distal end of the lens barrel 11101 is guided to the camera head 11102 and is incident on the lens unit 11401. The lens unit 11401 includes a combination of a plurality of lenses including a zoom lens and a focus lens.

The imaging unit 11402 includes an imaging element. The imaging element constituting the imaging unit 11402 may be one (so-called single-chip type) element, or a plurality of (so-called multi-chip type) elements. In a case where the imaging unit 11402 includes the multi-chip type, for example, image signals corresponding to R, G, and B may be generated by respective imaging elements, and a color image may be obtained by synthesizing the image signals. Alternatively, the imaging unit 11402 may include a pair of imaging elements for acquiring right-eye and left-eye image signals corresponding to three-dimensional (3D) display. The 3D display is performed, whereby the operator 11131 can grasp the depth of living tissue in a surgical portion more accurately. Note that, in a case where the imaging unit 11402 includes the multi-chip type, a plurality of systems of the lens units 11401 can be provided corresponding to respective imaging elements.

Furthermore, the imaging unit 11402 is not necessarily provided in the camera head 11102. For example, the imaging unit 11402 may be provided inside the lens barrel 11101 immediately after the objective lens.

The drive unit 11403 includes an actuator and moves the zoom lens and the focus lens of the lens unit 11401 by a predetermined distance along the optical axis by control of the camera head control unit 11405. As a result, the magnification and the focus of the captured image by the imaging unit 11402 can be appropriately adjusted.

The communication unit 11404 includes a communication device for transmitting/receiving various types of information to/from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling drive of the camera head 11102 from the CCU 11201, and supplies the control signal to the camera head control unit 11405. The control signal includes information regarding imaging conditions, for example, information that specifies the frame rate of the captured image, information that specifies the exposure value at the time of imaging, and/or information that specifies the magnification and focus of the captured image.

Note that, the imaging conditions such as the frame rate, exposure value, magnification, and focus described above may be appropriately specified by the user, or automatically set by the control unit 11413 of the CCU 11201 on the basis of the acquired image signal. In the latter case, a so-called auto exposure (AE) function, auto-focus (AF) function, and auto white balance (AWB) function are installed in the endoscope 11100.

The camera head control unit 11405 controls the drive of the camera head 11102 on the basis of the control signal from the CCU 11201 received via the communication unit 11404.

The communication unit 11411 includes a communication device for transmitting/receiving various types of information to/from the camera head 11102. The communication unit 11411 receives the image signal transmitted from the camera head 11102 via the transmission cable 11400.

Furthermore, the communication unit 11411 transmits the control signal for controlling the drive of the camera head 11102 to the camera head 11102. The image signal and the control signal can be transmitted by electrical communication, optical communication, or the like.

The image processing unit 11412 performs various types of image processing on the image signal that is RAW data transmitted from the camera head 11102.

The control unit 11413 performs various types of control related to imaging of a surgical portion or the like by the endoscope 11100 and display of the captured image obtained by the imaging of the surgical portion or the like. For example, the control unit 11413 generates the control signal for controlling the drive of the camera head 11102.

Furthermore, the control unit 11413 causes the display device 11202 to display the captured image of the surgical portion or the like on the basis of the image signal subjected to the image processing by the image processing unit 11412. At this time, the control unit 11413 may recognize various objects in the captured image by using various image recognition technologies. For example, the control unit 11413 detects color, a shape of an edge, and the like of the object included in the captured image, thereby being able to recognize a surgical tool such as a forceps, a specific body part, bleeding, mist at the time of using the energy treatment tool 11112, or the like. When causing the display device 11202 to display the captured image, the control unit 11413 may cause the display device 11202 to superimpose and display various types of surgery assistance information on the image of the surgical portion by using the recognition result. The surgery assistance information is superimposed and displayed, and presented to the operator 11131, whereby the burden on the operator 11131 can be reduced, and the operator 11131 can reliably perform surgery.

The transmission cable 11400 connecting the camera head 11102 and the CCU 11201 together is an electric signal cable adaptable to communication of electric signals, an optical fiber adaptable to optical communication, or a composite cable thereof.

Here, in the illustrated example, communication is performed by wire using the transmission cable 11400, but communication between the camera head 11102 and the CCU 11201 may be performed wirelessly.

In the above, an example has been described of the endoscopic surgical system to which the technology according to the present disclosure can be applied. The technology according to the present disclosure can be applied to the imaging unit 11402 of the camera head 11102, in the configuration described above. Specifically, the imaging device 1 of FIG. 1 can be applied to the imaging unit 10402. By applying the technology according to the present disclosure to the imaging unit 10402, the degradation of the image quality can be prevented, so that the operator can reliably confirm the surgical portion.

Note that, the endoscopic surgical system has been described as an example here; however, the technology according to the present disclosure may be applied to others, for example, a microscopic surgical system, and the like.

8. Application Example to Mobile Body

The technology according to the present disclosure (the present technology) can be applied to various products. The technology according to the present disclosure may be implemented as a device mounted on any type of mobile body, for example, a car, an electric car, a hybrid electric car, a motorcycle, a bicycle, a personal mobility, an airplane, a drone, a ship, a robot, or the like.

Figure 16:
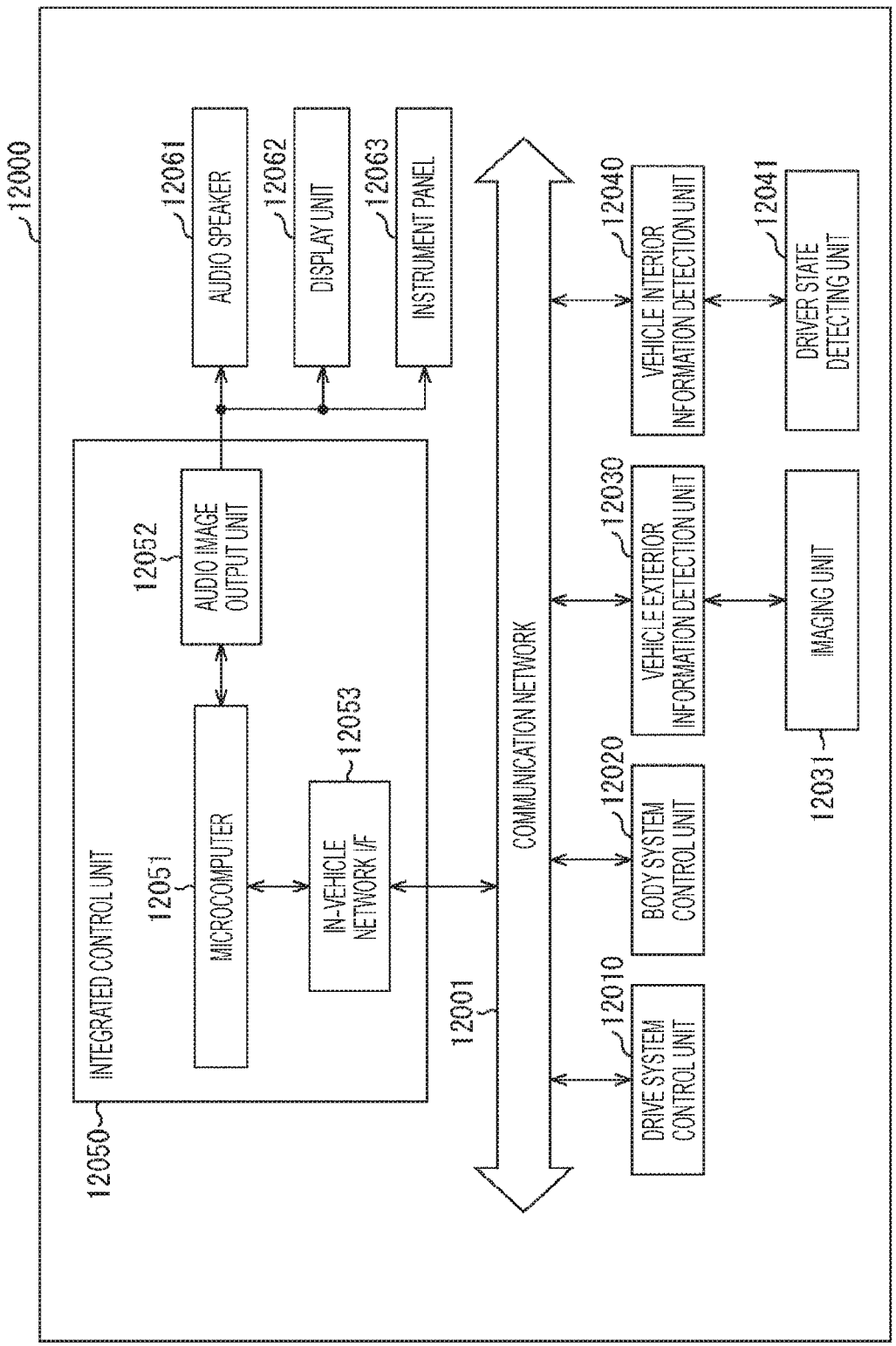
FIG. 16 is a block diagram illustrating an example of a schematic configuration of a vehicle control system.

FIG. 16 is a block diagram illustrating a schematic configuration example of a vehicle control system that is an example of a mobile body control system to which the technology according to the present disclosure can be applied.

A vehicle control system 12000 includes a plurality of electronic control units connected to each other via a communication network 12001. In the example illustrated in FIG. 16, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, an audio image output unit 12052, and an in-vehicle network interface (I/F) 12053 are illustrated.

The drive system control unit 12010 controls operation of devices related to a drive system of a vehicle in accordance with various programs. For example, the drive system control unit 12010 functions as a control device of a driving force generating device for generating driving force of the vehicle, such as an internal combustion engine or a driving motor, a driving force transmitting mechanism for transmitting driving force to wheels, a steering mechanism for adjusting a steering angle of the vehicle, a braking device for generating braking force of the vehicle, and the like.

The body system control unit 12020 controls operation of various devices equipped on the vehicle body in accordance with various programs. For example, the body system control unit 12020 functions as a control device of a keyless entry system, a smart key system, a power window device, or various lamps such as a head lamp, a back lamp, a brake lamp, a turn signal lamp, and a fog lamp. In this case, to the body system control unit 12020, a radio wave transmitted from a portable device that substitutes for a key, or signals of various switches can be input. The body system control unit 12020 accepts input of these radio waves or signals and controls a door lock device, power window device, lamp, and the like of the vehicle.

The vehicle exterior information detection unit 12030 detects information on the outside of the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image outside the vehicle and receives the image captured. The vehicle exterior information detection unit 12030 may perform object detection processing or distance detection processing on a person, a car, an obstacle, a sign, a character on a road surface, or the like, on the basis of the received image.

The imaging unit 12031 is an optical sensor that receives light and outputs an electric signal corresponding to an amount of light received. The imaging unit 12031 can output the electric signal as an image, or as distance measurement information. Furthermore, the light received by the imaging unit 12031 may be visible light, or invisible light such as infrared rays.

The vehicle interior information detection unit 12040 detects information on the inside of the vehicle. The vehicle interior information detection unit 12040 is connected to, for example, a driver state detecting unit 12041 that detects a state of a driver. The driver state detecting unit 12041 includes, for example, a camera that captures an image of the driver, and the vehicle interior information detection unit 12040 may calculate a degree of fatigue or a degree of concentration of the driver, or determine whether or not the driver is dozing, on the basis of the detection information input from the driver state detecting unit 12041.

The microcomputer 12051 can calculate a control target value of the driving force generating device, the steering mechanism, or the braking device on the basis of the information on the inside and outside of the vehicle acquired by the vehicle exterior information detection unit 12030 or the vehicle interior information detection unit 12040, and output a control command to the drive system control unit 12010. For example, the microcomputer 12051 can perform cooperative control aiming for implementing functions of advanced driver assistance system (ADAS) including collision avoidance or shock mitigation of the vehicle, follow-up traveling based on an inter-vehicle distance, vehicle speed maintaining traveling, vehicle collision warning, vehicle lane departure warning, or the like.

Furthermore, the microcomputer 12051 can perform cooperative control aiming for automatic driving that autonomously travels without depending on operation of the driver, or the like, by controlling the driving force generating device, the steering mechanism, the braking device, or the like on the basis of information on the periphery of the vehicle acquired by the vehicle exterior information detection unit 12030 or the vehicle interior information detection unit 12040.

Furthermore, the microcomputer 12051 can output a control command to the body system control unit 12020 on the basis of information on the outside of the vehicle acquired by the vehicle exterior information detection unit 12030. For example, the microcomputer 12051 can perform cooperative control aiming for preventing dazzling such as switching from the high beam to the low beam, by controlling the head lamp depending on a position of a preceding vehicle or an oncoming vehicle detected by the vehicle exterior information detection unit 12030.

The audio image output unit 12052 transmits at least one of audio or image output signals to an output device capable of visually or aurally notifying an occupant in the vehicle or the outside of the vehicle of information. In the example of FIG. 16, as the output device, an audio speaker 12061, a display unit 12062, and an instrument panel 12063 are illustrated. The display unit 12062 may include, for example, at least one of an on-board display or a head-up display.

Figure 17:
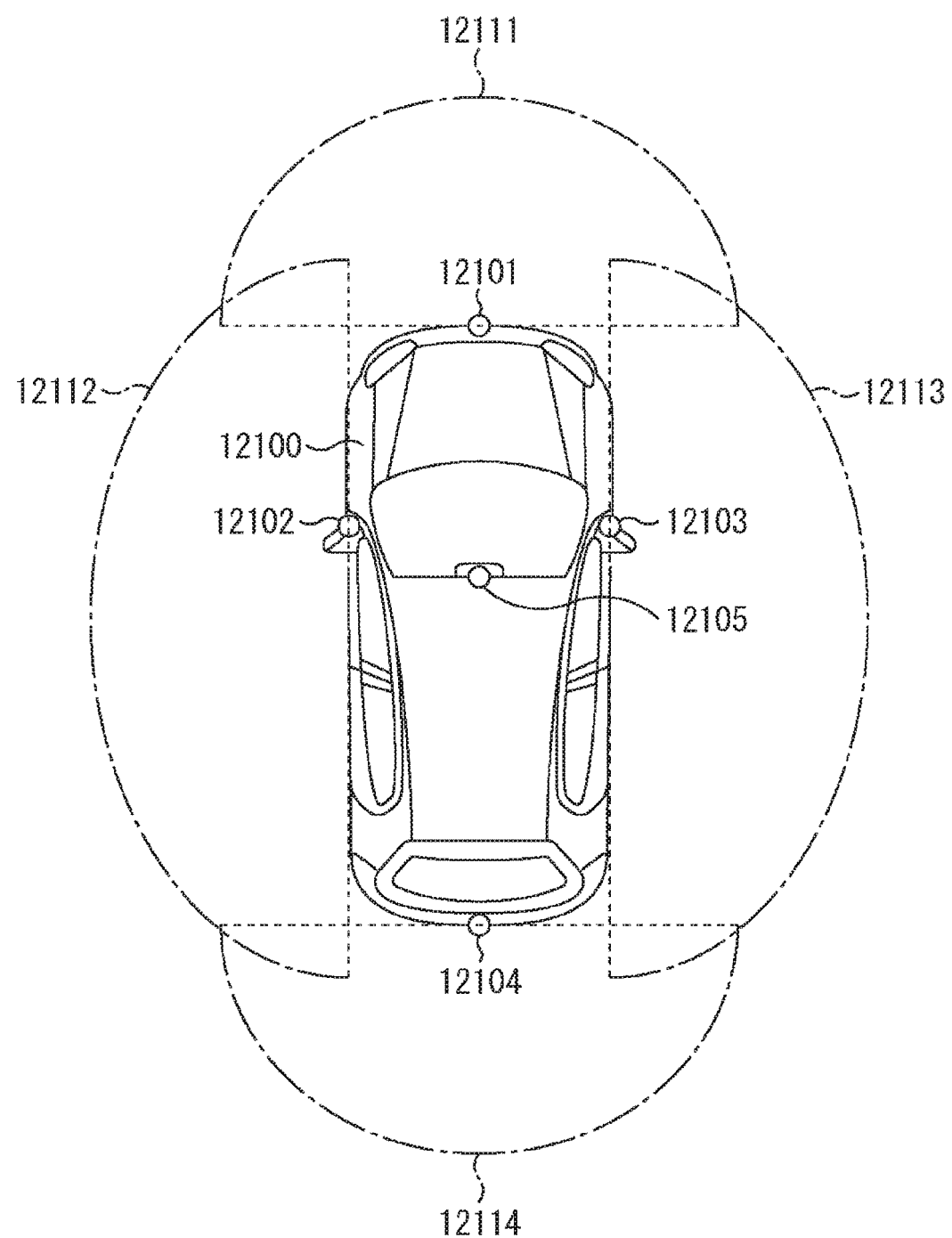
FIG. 17 is an explanatory diagram illustrating an example of installation positions of a vehicle exterior information detecting unit and an imaging unit.

FIG. 17 is a diagram illustrating an example of installation positions of the imaging unit 12031.

In FIG. 17, a vehicle 12100 includes imaging units 12101, 12102, 12103, 12104, and 12105 as the imaging unit 12031.

Imaging units 12101, 12102, 12103, 12104, and 12105 are provided at, for example, at a position of the front nose, the side mirror, the rear bumper, the back door, the upper part of the windshield in the vehicle interior, or the like, of a vehicle 12100. The imaging unit 12101 provided at the front nose and the imaging unit 12105 provided at the upper part of the windshield in the vehicle interior mainly acquire images ahead of the vehicle 12100. The imaging units 12102 and 12103 provided at the side mirrors mainly acquire images on the sides of the vehicle 12100. The imaging unit 12104 provided at the rear bumper or the back door mainly acquires an image behind the vehicle 12100. The front images acquired by the imaging units 12101 and 12105 are mainly used for detection of a preceding vehicle, a pedestrian, an obstacle, a traffic signal, a traffic sign, a lane, or the like.

Note that, FIG. 17 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, an imaging range 12114 indicates an imaging range of the imaging unit 12104 provided at the rear bumper or the back door. For example, image data captured by the imaging units 12101 to 12104 are superimposed on each other, whereby an overhead image is obtained of the vehicle 12100 viewed from above.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, on the basis of the distance information obtained from the imaging units 12101 to 12104, the microcomputer 12051 obtains a distance to each three-dimensional object within the imaging ranges 12111 to 12114, and a temporal change of the distance (relative speed to the vehicle 12100), thereby being able to extract, as a preceding vehicle, a three-dimensional object that is in particular a closest three-dimensional object on a traveling path of the vehicle 12100 and traveling at a predetermined speed (for example, greater than or equal to 0 km/h) in substantially the same direction as that of the vehicle 12100. Moreover, the microcomputer 12051 can set an inter-vehicle distance to be ensured in advance in front of the preceding vehicle, and can perform automatic brake control (including follow-up stop control), automatic acceleration control (including follow-up start control), and the like. As described above, it is possible to perform cooperative control aiming for automatic driving that autonomously travels without depending on operation of the driver, or the like.

For example, on the basis of the distance information obtained from the imaging units 12101 to 12104, the microcomputer 12051 can extract three-dimensional object data regarding the three-dimensional object by classifying the objects into a two-wheeled vehicle, a regular vehicle, a large vehicle, a pedestrian, and other three-dimensional objects such as a utility pole, and use the data for automatic avoidance of obstacles. For example, the microcomputer 12051 identifies obstacles in the periphery of the vehicle 12100 into an obstacle visually recognizable to the driver of the vehicle 12100 and an obstacle difficult to be visually recognized. Then, the microcomputer 12051 determines a collision risk indicating a risk of collision with each obstacle, and when the collision risk is greater than or equal to a set value and there is a possibility of collision, the microcomputer 12051 outputs an alarm to the driver via the audio speaker 12061 and the display unit 12062, or performs forced deceleration or avoidance steering via the drive system control unit 12010, thereby being able to perform driving assistance for collision avoidance.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such pedestrian recognition is performed by, for example, a procedure of extracting feature points in the captured images of the imaging units 12101 to 12104 as infrared cameras, and a procedure of performing pattern matching processing on a series of feature points indicating a contour of an object to determine whether or not the object is a pedestrian. When the microcomputer 12051 determines that a pedestrian exists in the captured images of the imaging units 12101 to 12104 and recognizes the pedestrian, the audio image output unit 12052 controls the display unit 12062 so that a rectangular contour line for emphasis is superimposed and displayed on the recognized pedestrian. Furthermore, the audio image output unit 12052 may control the display unit 12062 so that an icon or the like indicating the pedestrian is displayed at a desired position.

In the above, an example has been described of the vehicle control system to which the technology according to the present disclosure can be applied. The technology according to the present disclosure can be applied to the imaging unit 12031 and the like, in the configuration described above. Specifically, the imaging device 1 of FIG. 1 can be applied to the imaging units 12031 and 12101 to 12105. By applying the technology according to the present disclosure to the imaging unit 12031 and the like, the degradation of the image quality can be prevented, so that driver's fatigue can be reduced.

Finally, the above description of each embodiment is an example of the present disclosure, and the present disclosure is not limited to the above embodiments. For this reason, it goes without saying that various changes other than the embodiments described above can be made depending on the design and the like as long as they do not deviate from the technical idea according to the present disclosure.

Note that, the present technology can also be configured as described below.

(1) An imaging device drive circuit including:
a plurality of control signal lines, each of which transmits a control signal for each of a plurality of pixels that generates image signals depending on incident light on the basis of the control signal;
a control signal distribution line that has a shape of a line and to which the plurality of control signal lines is connected in a distributed manner and that distributes the control signal supplied from each of both ends of the line to the plurality of control signal lines;
two control signal transmission units, each of which includes a plurality of transmission paths each including a signal shaping unit that shapes the control signal, and transmits the control signal to each of ends of the control signal distribution line; and
two operation units arranged at the respective ends of the control signal distribution line, the operation units each performing an operation on a plurality of the control signals respectively transmitted by the plurality of transmission paths and supplying an operation result to a corresponding one of the ends.

(2) The imaging device drive circuit according to (1), in which the operation units each perform a logical product operation on the plurality of control signals transmitted.

(3) The imaging device drive circuit according to (1), in which the operation units each perform a logical sum operation on the plurality of control signals transmitted.

(4) The imaging device drive circuit according to (1), in which the operation units each perform a majority operation on the plurality of control signals transmitted.

(5) The imaging device drive circuit according to any of (1) to (4), in which the control signal transmission units each include a plurality of the signal shaping units arranged in a distributed manner in a corresponding one of the transmission paths.

(6) The imaging device drive circuit according to any one of (1) to (5), further including a control signal output unit that is arranged on the plurality of control signal lines and converts the control signal transmitted into the control signal for each of the pixels.

(7) An imaging device including:
a plurality of pixels that generates image signals depending on incident light on the basis of a control signal;
a plurality of control signal lines, each of which transmits the control signal for each of the plurality of pixels;
a control signal distribution line that has a shape of a line and to which the plurality of control signal lines is connected in a distributed manner and that distributes the control signal supplied from each of both ends of the line to the plurality of control signal lines;
two control signal transmission units, each of which includes a plurality of transmission paths each including a signal shaping unit that shapes the control signal, and transmits the control signal to each of ends of the control signal distribution line; and
two operation units arranged at the respective ends of the control signal distribution line, the operation units each performing an operation on a plurality of the control signals respectively transmitted by the plurality of transmission paths and supplying an operation result to a corresponding one of the ends.

REFERENCE SIGNS LIST

1 Imaging device
10 Pixel array unit
11, 41 Signal line
20 Vertical drive unit
21, 24, 24a, 24b Inverting gate
22, 22a, 22b Control signal transmission unit
23, 23a, 23b, 28, 28a, 28b, 29, 29a, 29b Operation unit
25 Control signal distribution line
26 Control signal output unit
30 Column signal processing unit
40 Control unit
100 Pixel
221 Signal shaping unit

222 Transmission path
1002 Imaging element
10402, 12031, 12101 to 12105 Imaging unit

The invention claimed is:

1. An imaging device drive circuit comprising:
 a plurality of control signal lines, each of which transmits a control signal for each of a plurality of pixels that generates image signals depending on incident light on a basis of the control signal;
 a control signal distribution line that has a shape of a line and to which the plurality of control signal lines is connected in a distributed manner and that distributes the control signal supplied from each of both ends of the line to the plurality of control signal lines;
 two control signal transmission units, each of which includes a plurality of transmission paths each including a signal shaping unit that shapes the control signal, and transmits the control signal to each of ends of the control signal distribution line; and
 two operation units arranged at the respective ends of the control signal distribution line, the operation units each performing an operation on a plurality of the control signals respectively transmitted by the plurality of transmission paths and supplying an operation result to a corresponding one of the ends.

2. The imaging device drive circuit according to claim 1, wherein the operation units each perform a logical product operation on the plurality of control signals transmitted.

3. The imaging device drive circuit according to claim 1, wherein the operation units each perform a logical sum operation on the plurality of control signals transmitted.

4. The imaging device drive circuit according to claim 1, wherein the operation units each perform a majority operation on the plurality of control signals transmitted.

5. The imaging device drive circuit according to claim 1, wherein the control signal transmission units each include a plurality of the signal shaping units arranged in a distributed manner in a corresponding one of the transmission paths.

6. The imaging device drive circuit according to claim 1, further comprising a control signal output unit that is arranged on the plurality of control signal lines and converts the control signal transmitted into the control signal for each of the pixels.

7. An imaging device comprising:
 a plurality of pixels that generates image signals depending on incident light on a basis of a control signal;
 a plurality of control signal lines, each of which transmits the control signal for each of the plurality of pixels;
 a control signal distribution line that has a shape of a line and to which the plurality of control signal lines is connected in a distributed manner and that distributes the control signal supplied from each of both ends of the line to the plurality of control signal lines;
 two control signal transmission units, each of which includes a plurality of transmission paths each including a signal shaping unit that shapes the control signal, and transmits the control signal to each of ends of the control signal distribution line; and
 two operation units arranged at the respective ends of the control signal distribution line, the operation units each performing an operation on a plurality of the control signals respectively transmitted by the plurality of transmission paths and supplying an operation result to a corresponding one of the ends.

* * * * *